United States Patent
Itou

(10) Patent No.: US 11,415,443 B2
(45) Date of Patent: Aug. 16, 2022

(54) FLOW RATE DETECTOR

(71) Applicant: DENSO CORPORATION, Kariya (JP)

(72) Inventor: Kengo Itou, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 17/108,253

(22) Filed: Dec. 1, 2020

(65) Prior Publication Data
US 2021/0164818 A1    Jun. 3, 2021

(30) Foreign Application Priority Data

Dec. 3, 2019   (JP) .............................. JP2019-219112

(51) Int. Cl.
*G01F 1/684*   (2006.01)
*G01K 13/02*   (2021.01)

(52) U.S. Cl.
CPC ............ *G01F 1/684* (2013.01); *G01F 1/6842* (2013.01); *G01K 13/026* (2021.01)

(58) Field of Classification Search
CPC ...... G01F 1/684; G01F 1/6842; G01K 13/026
See application file for complete search history.

(56) References Cited

U.S. PATENT DOCUMENTS

| | | | | |
|---|---|---|---|---|
| 7,043,993 B2* | 5/2006 | Hayashi | ................... | G01L 19/02 73/708 |
| 2004/0058589 A1* | 3/2004 | Satou | ..................... | G01F 1/684 439/894 |
| 2012/0192632 A1* | 8/2012 | Matsumoto | ............... | G01F 5/00 73/114.31 |
| 2019/0170589 A1 | 6/2019 | Yatsumonji et al. | | |
| 2021/0325227 A1* | 10/2021 | Sudou | ..................... | G01F 15/00 |

FOREIGN PATENT DOCUMENTS

| JP | 2012242298 A | * | 12/2012 | |
|---|---|---|---|---|
| JP | 2018-179613 | | 11/2018 | |
| WO | WO-2019102737 A1 | * | 5/2019 | ........... G01F 1/6842 |
| WO | WO-2021166419 A1 | * | 8/2021 | ............. G01F 1/684 |

* cited by examiner

*Primary Examiner* — Ryan D Walsh
(74) *Attorney, Agent, or Firm* — Nixon & Vanderhye P.C.

(57) ABSTRACT

A flow rate detector includes: a housing; and a substrate assembly disposed in the housing. The substrate assembly has a flow rate detection element, a temperature detection element, and a circuit board on which the flow rate detection element and the temperature detection element are mounted. The circuit board includes a body portion fixed to the housing, and a protrusion extended to protrude from the body portion. The protrusion has an element fix portion to which the temperature detection element is fixed. The protrusion has a supported portion within a supported range including a position of the element fix portion. The supported range is defined from the element fix portion to a tip end of the protrusion along an extension direction of the protrusion. The supported portion is supported by the housing to suppress a displacement of the element fix portion in a thickness direction of the circuit board.

9 Claims, 29 Drawing Sheets

THE OTHER SIDE ⟵ ⟶ ONE SIDE
Da

ONE SIDE ←——→ THE OTHER SIDE
Da

FLOW RATE DETECTOR

CROSS REFERENCE TO RELATED APPLICATION

This application is based on Japanese Patent Application No. 2019-219112 filed on Dec. 3, 2019, the disclosure of which is incorporated herein by reference in its entirety.

TECHNICAL FIELD

The present disclosure relates to a flow rate detector that detects a flow rate of fluid.

BACKGROUND

A physical quantity detector such as a flow rate detector includes a circuit board and a housing to which the circuit board is fixed. A flow rate detection element and a temperature detection element are mounted on the circuit board. The housing houses the circuit board.

SUMMARY

According to an aspect of the present disclosure, a flow rate detector includes a housing and a substrate assembly disposed in the housing. The substrate assembly has: a flow rate detection element to detect a flow rate of fluid; a temperature detection element to detect a temperature of the fluid; and a circuit board on which the flow rate detection element and the temperature detection element are mounted. The circuit board includes a body portion fixed to the housing, and a protrusion extended to protrude from the body portion. The protrusion has an element fix portion to which the temperature detection element is fixed. The protrusion has a supported portion along an extension direction of the protrusion within a supported range including a position of the element fix portion. The supported range is defined from the element fix portion to a tip end of the protrusion. The supported portion is supported by the housing so as to suppress a displacement of the element fix portion in a thickness direction of the circuit board.

According to another aspect of the present disclosure, a flow rate detector includes: a housing; a substrate assembly disposed in the housing and having a flow rate detection element to detect a flow rate of fluid, a temperature detection element to detect a temperature of the fluid, and a circuit board on which the flow rate detection element and the temperature detection element are mounted; and an attachment member fixed to the housing. The circuit board includes a body portion fixed to the housing, and a protrusion extended to protrude from the body portion. The protrusion has an element fix portion to which the temperature detection element is fixed. A temperature detection passage is defined for the fluid, in which the temperature detection element is arranged. The attachment member has a plurality of outlets of the temperature detection passage. The attachment member has a partition part that partitions the plurality of outlets from each other. The partition part supports the protrusion so as to suppress a displacement of the element fix portion in a thickness direction of the circuit board.

DETAILED DESCRIPTION

Figure 1:
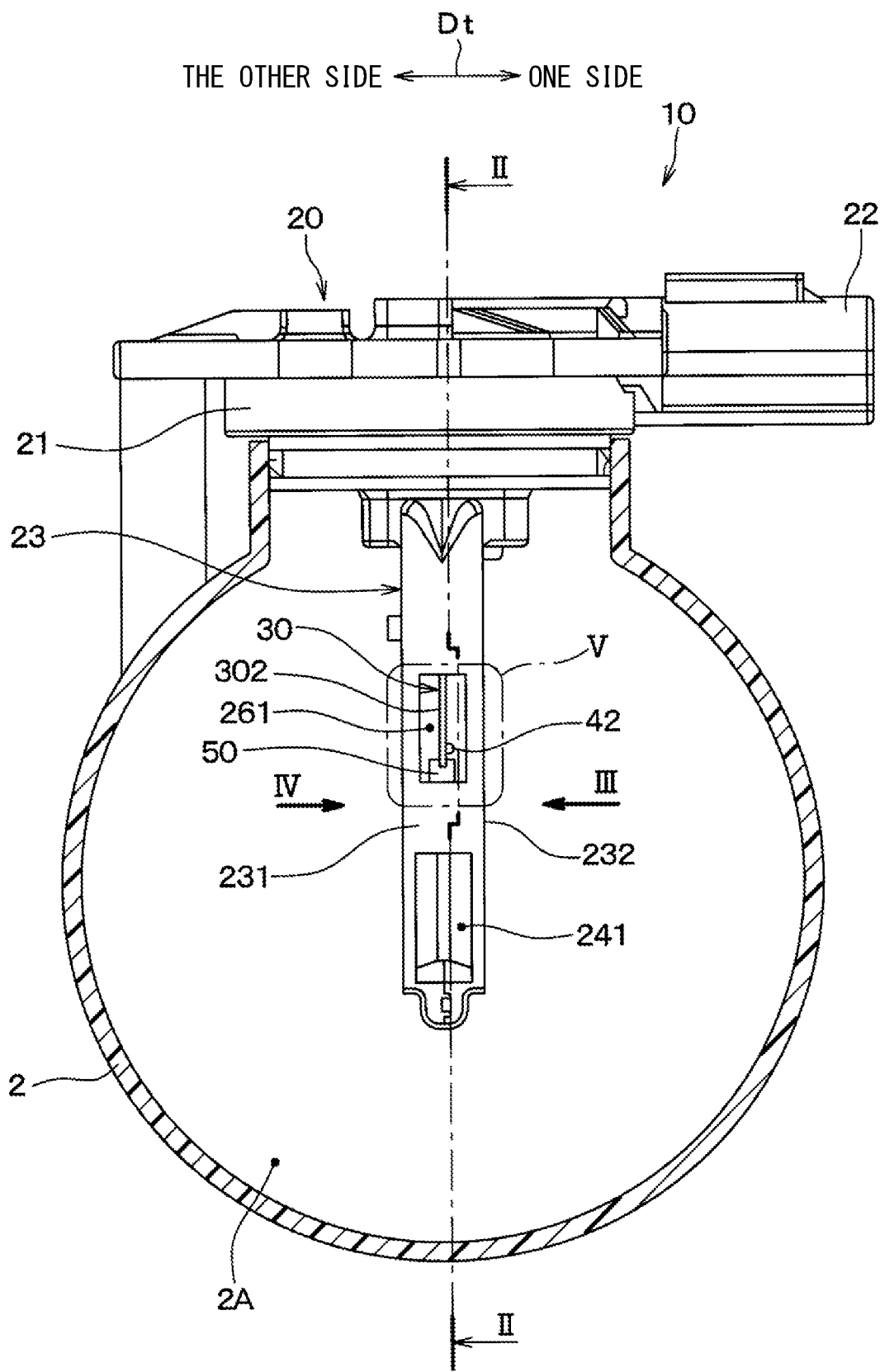
FIG. 1 is a view illustrating a flow rate detector according to a first embodiment seen in an extending direction of a main passage and a cross-sectional view illustrating an intake pipe in which the flow rate detector is mounted.

To begin with, examples of relevant techniques will be described.

A physical quantity detector such as a flow rate detector includes a circuit board on which a flow rate detection element and a temperature detection element are mounted, and a housing to which the circuit board is fixed and which houses the circuit board. The circuit board has a protruding portion that partially protrudes, and the temperature detection element is arranged at a part of the protruding portion that is close to the tip end.

In the physical quantity detector, the protruding portion of the circuit board is fixed to the housing at the base end of the protruding portion, but is not fixed to the housing at the tip end of the protruding portion. That is, the tip end of the protruding portion is a free end that is not fixed, such that the protruding portion has a cantilever structure. When vibration is applied to the physical quantity detector from the outside, the protruding portion of the circuit board is likely to vibrate, and there is a concern that the protruding portion may be damaged by the vibration. The above-described facts have been discovered by the inventor of the present disclosure.

The present disclosure provides a flow rate detector capable of reducing the possibility that the protruding portion of the circuit board is damaged by vibration.

According to an aspect of the present disclosure, a flow rate detector includes a housing and a substrate assembly disposed in the housing. The substrate assembly has: a flow rate detection element to detect a flow rate of fluid; a temperature detection element to detect a temperature of the fluid; and a circuit board on which the flow rate detection element and the temperature detection element are mounted. The circuit board includes a body portion fixed to the housing, and a protrusion extended to protrude from the body portion. The protrusion has an element fix portion to which the temperature detection element is fixed. The protrusion has a supported portion along an extension direction of the protrusion within a supported range including a position of the element fix portion. The supported range is defined from the element fix portion to a tip end of the protrusion. The supported portion is supported by the housing so as to suppress a displacement of the element fix portion in a thickness direction of the circuit board.

With this configuration, the protrusion of the circuit board is supported substantially at the both ends. Therefore, when the flow rate detector vibrates, the bending deformation of the protrusion due to the vibration is suppressed, compared with a conventional physical quantity detector. Therefore, as compared with the conventional structure, it is possible to reduce the possibility that the protrusion of the circuit board is damaged by the vibration.

According to another aspect of the present disclosure, a flow rate detector includes: a housing; a substrate assembly disposed in the housing and having a flow rate detection element to detect a flow rate of fluid, a temperature detection element to detect a temperature of the fluid, and a circuit board on which the flow rate detection element and the temperature detection element are mounted; and an attachment member fixed to the housing. The circuit board includes a body portion fixed to the housing, and a protrusion extended to protrude from the body portion. The protrusion has an element fix portion to which the temperature detection element is fixed. A temperature detection passage is defined for the fluid, in which the temperature detection element is arranged. The attachment member has a plurality of outlets of the temperature detection passage. The attachment member has a partition part that partitions the plurality of outlets from each other. The partition part supports the protrusion so as to suppress a displacement of the element fix portion in a thickness direction of the circuit board.

Accordingly, when the flow rate detector vibrates, a bending deformation of the protrusion caused by the vibration is suppressed, since the protrusion is supported by the attachment member. Therefore, similarly to the above flow rate detector, it is possible to reduce the possibility that the protrusion of the circuit board is damaged by the vibration, as compared with the conventional structure.

A reference numeral attached to each component indicates an example of correspondence with the specific component described in embodiments below.

Hereinafter, embodiments will be described with reference to the drawings. In the following embodiments, the same reference numeral is given to the same or equivalent parts in the drawings.

First Embodiment

In the present embodiment, a flow rate detector 10 of the present disclosure is applied to an internal combustion engine control system that controls an internal combustion engine. The flow rate detector 10 of the present embodiment measures various physical quantities such as flow rate and temperature of fluid such as intake air drawn into the internal combustion engine. The internal combustion engine control system controls the opening degree of a throttle valve, a fuel injection valve, and a spark plug, which are not shown, in response to the measurement result of the flow rate detector 10, so as to control the flow rate of the fluid supplied to the internal combustion engine, the amount of fuel, and the ignition timing.

Figure 2:
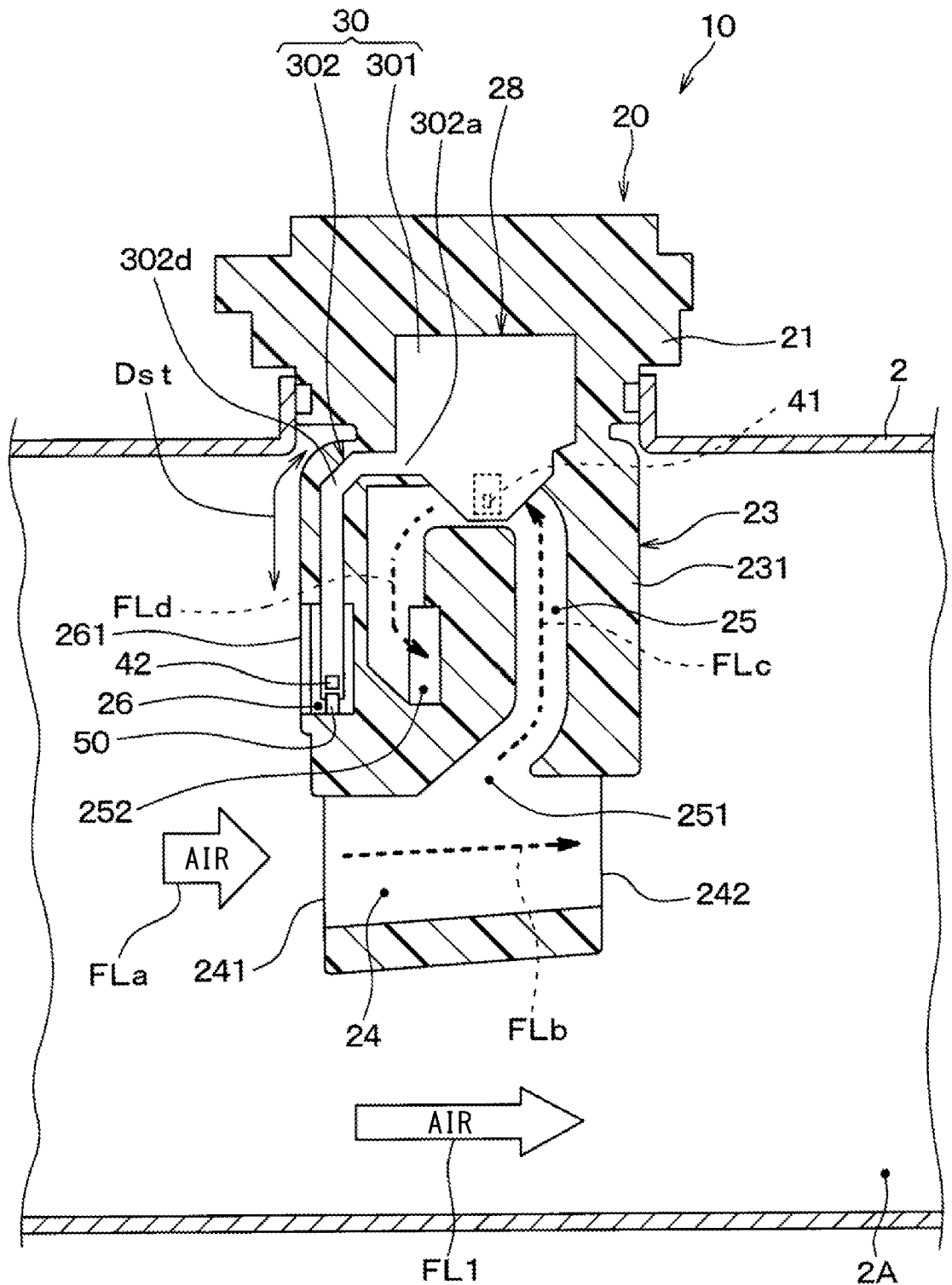
FIG. 2 is a cross-sectional view taken along a line II-II of FIG. 1.

As shown in FIGS. 1 and 2, the flow rate detector 10 is attached to an intake pipe 2 through which the fluid to be measured flows. The intake pipe 2 is a cylindrical pipe that forms a main passage 2A through which air flow as the fluid to be measured. The main passage 2A extends in a main passage extending direction Da, and the fluid flows in the main passage 2A. One side in the main passage extending direction Da corresponds to the upstream side, and the other side in the main passage extending direction Da corresponds to the downstream side. The intake pipe 2 is not limited to a cylindrical pipe, and may be, for example, a rectangular pipe.

The flow rate detector 10 includes a housing 20 as a casing of the flow rate detector 10 and a substrate assembly 28. The substrate assembly 28 includes a circuit board 30 and plural components mounted on the circuit board 30.

Specifically, the substrate assembly 28 includes the circuit board 30, and a flow rate detection element 41 and a temperature detection element 42 mounted on the circuit board 30. The flow rate detection element 41 detects the flow rate of the fluid to be measured, and the temperature detection element 42 detects the temperature of the fluid to be measured. In FIG. 2, the flow rate detection element 41 is mounted on the back side of the circuit board 30, therefore is shown by a broken line, and the temperature detection element 42 is mounted on the front side of the circuit board 30, therefore is shown by a solid line. Since both the flow rate and the temperature of the fluid are physical quantities of the fluid, the flow rate detection element 41 and the temperature detection element 42 may be referred to as physical quantity detection element.

As shown in FIGS. 1 to 4, at least a part of the housing 20 of the flow rate detector 10 is arranged in the main passage 2A. The housing 20 has a flange portion 21, an external connection portion 22, and a measuring unit 23. The flange portion 21 is arranged for fixing the flow rate detector 10 to the intake pipe 2. The external connection portion 22 is exposed from the flange portion 21 to the outside for electrical connection with an external device. The measuring unit 23 projects from the flange portion 21 toward the center of the main passage 2A. For example, the housing 20 is made of resin.

The flange portion 21 is fitted into a mounting hole provided in the intake pipe 2, thereby being connected to the intake pipe 2.

The external connection portion 22 is provided on the upper surface of the flange portion 21 and is arranged outside the intake pipe 2. The arrow direction FL1 in FIG. 2 indicates the flow of the fluid in the main passage 2A.

The external connection portion 22 electrically connects the flow rate detector 10 to a control device (not shown) of the internal combustion engine control system. Information indicating the measurement result is output from the flow rate detector 10 to the outside via a connection terminal housed in the external connection portion 22. Further, electric power for driving the flow rate detector 10 is supplied via the connection terminal in the external connection portion 22.

The measuring unit 23 has a base end portion connected to the flange portion 21, and extends from the flange portion 21 along the radial direction of the intake pipe 2 into the main passage 2A. The measuring unit 23 forms a substantially plate shape having a certain thickness to spread along the flow direction of the fluid in the main passage 2A (in other words, the main passage extending direction Da). The thickness direction of the measuring unit 23 is the same as the thickness direction Dt of the circuit board 30 of the substrate assembly 28, and is orthogonal to the main passage extending direction Da.

Figure 3:
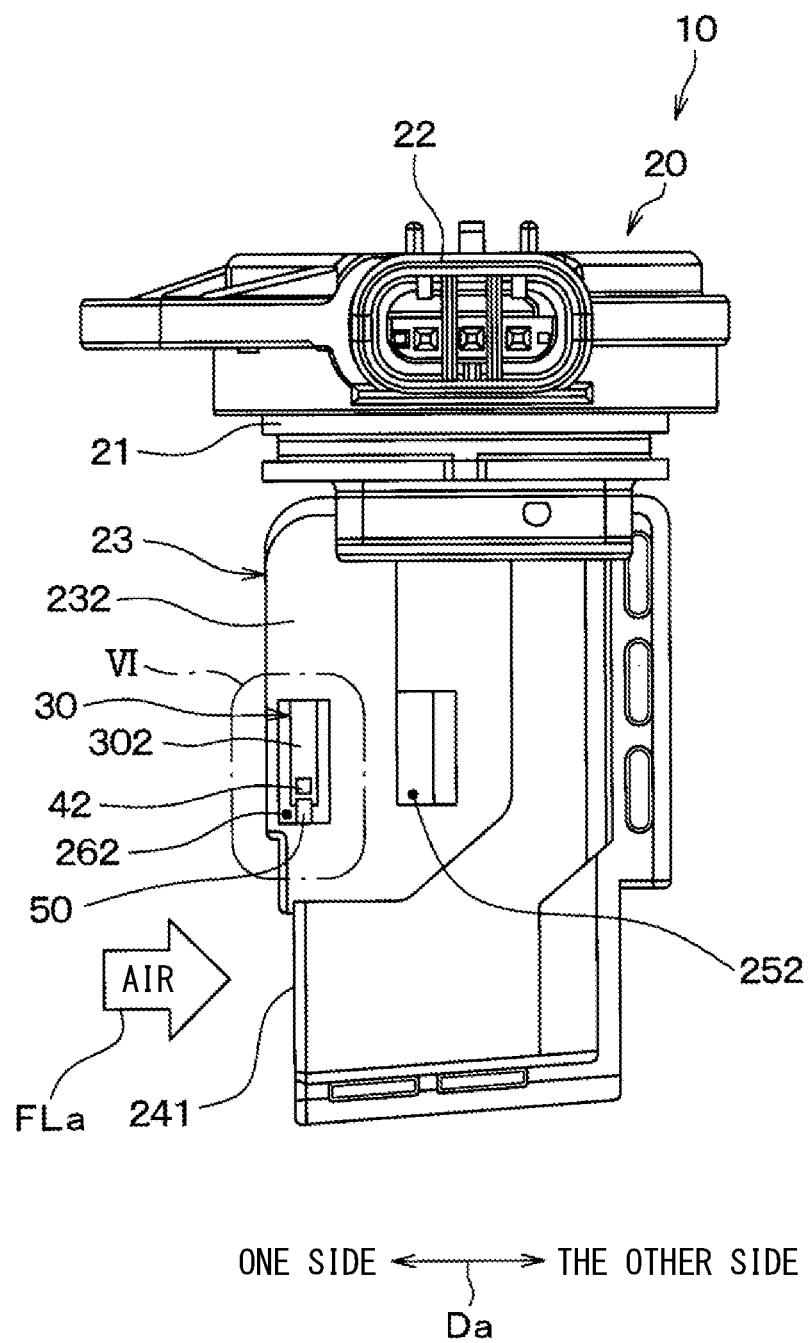
FIG. 3 is a side view illustrating the flow rate detector seen in an arrow direction III in FIG. 1.
Figure 4:
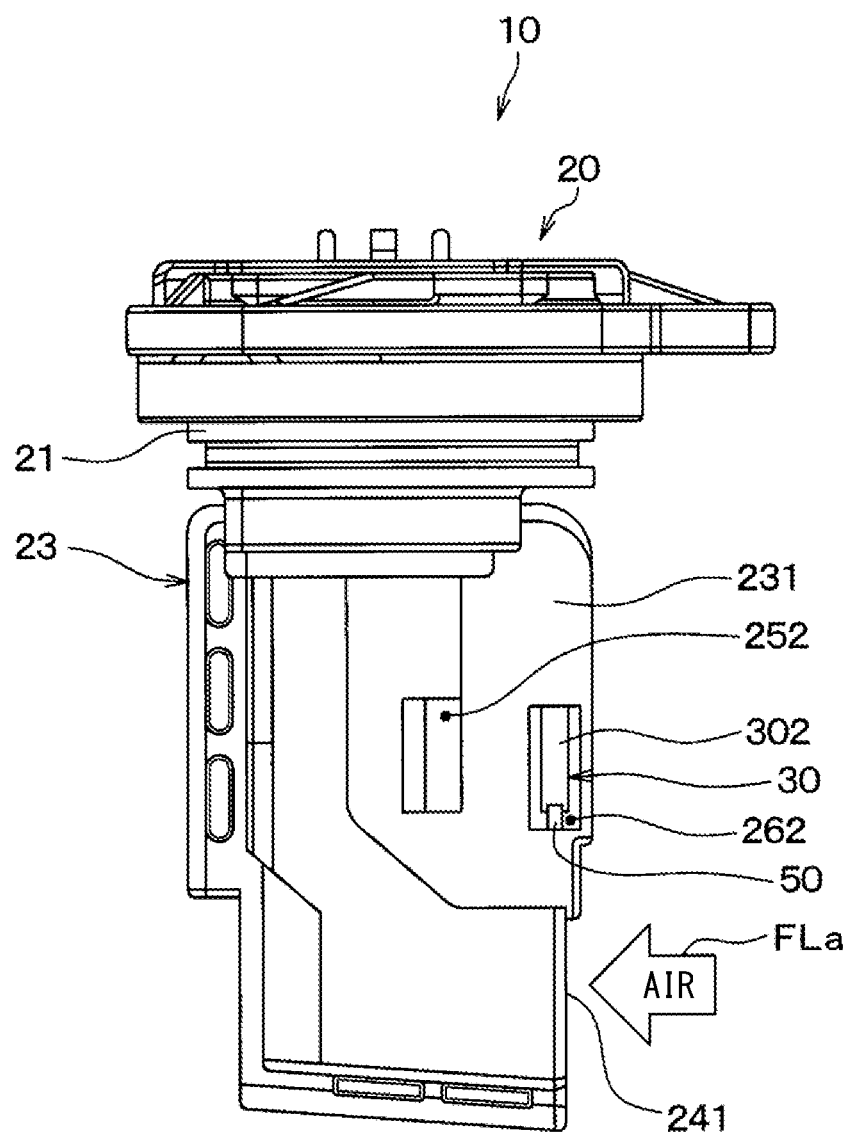
FIG. 4 is a side view illustrating the flow rate detector seen in an arrow direction IV in FIG. 1.

In the description of this embodiment, the thickness direction Dt of the circuit board 30 will be referred to as a board thickness direction Dt. In FIGS. 2 to 4, the board thickness direction Dt coincides with a direction perpendicular to the paper surface. In FIGS. 2 and 3, the front side in the direction perpendicular to the paper surface is one side in the board thickness direction Dt, and the back side in the direction perpendicular to the paper surface is the other side in the board thickness direction Dt.

The measuring unit 23 has a sub passage 24, which is a fluid passage through which the fluid flows, a flow rate detection passage 25, and a temperature detection passage 26. The measuring unit 23 includes the substrate assembly 28. In short, the substrate assembly 28 is provided within the housing 20. Specifically, the measuring unit 23 has a measuring unit body 231 and a measuring unit cover 232.

The measuring unit body 231 is formed integrally with, for example, the flange portion 21. The measuring unit cover 232 forms a substantially plate shape having a thickness in the board thickness direction Dt. As shown in FIGS. 1 to 3, the measuring unit cover 232 is arranged so as to cover the measuring unit body 231 from one side in the board thickness direction Dt, and is joined to the measuring unit body 231, for example, by welding. By joining the measuring unit cover 232 to the measuring unit body 231, the sub passage 24, the flow rate detection passage 25, and the temperature detection passage 26 are formed inside the measuring unit 23, which forms a part of the housing 20, through which the fluid flows. The circuit board 30 is sandwiched between the measuring unit body 231 and the measuring unit cover 232, whereby the circuit board 30 is fixed to the measuring unit 23.

As shown in FIG. 1 to FIG. 4, the sub passage 24 has a sub-passage inlet 241 provided at one side of the measuring unit 23 in the main passage extending direction Da and a sub-passage outlet 242 provided on the other side in the main passage extending direction Da to communicate with each other. The sub-passage inlet 241 is open in the main passage 2A to face one side in the main passage extending direction Da, and the sub-passage outlet 242 is open in the main passage 2A to face the other side in the main passage extending direction Da. Therefore, a part of the fluid flowing in the forward direction in the main passage 2A as indicated by the arrow direction FL1 flows into the sub passage 24 from the sub-passage inlet 241 as shown by the arrow direction FLa in FIG. 2. The fluid flows in the sub passage 24 as shown by the arrow direction FLb, and flows out of the sub-passage outlet 242 to the main passage 2A.

The flow rate detection passage 25 has a flow rate detection passage inlet 251 provided in the middle of the sub passage 24. The flow rate detection passage 25 has two flow rate detection passage outlets 252, one of which is provided on the side surface of the measuring unit body 231, and the other is provided on the side surface of the measuring unit cover 232. The flow rate detection passage 25 communicates the flow rate detection passage inlet 251 and the flow rate detection passage outlets 252 with each other. Therefore, a part of the fluid flowing through the sub passage 24 flows into the flow rate detection passage 25 from the flow rate detection passage inlet 251. The fluid flows through the flow rate detection passage 25 as indicated by the arrows FLc and FLd in FIG. 2, and flows out from the flow rate detection passage outlets 252 to the main passage 2A. Thus, a part of the fluid flowing through the main passage 2A flows through the flow rate detection passage 25. The passage cross-sectional area of the flow rate detection passage 25 is larger than the passage cross-sectional area (in other words, the opening area) of the sub-passage outlet 242.

Further, the sub passage 24 is formed so as to extend substantially linearly from one side to the other side in the board thickness direction Dt. The flow rate detection passage 25 is connected to the sub passage 24 from the upper side of the sub passage 24. Therefore, when a pollutant substance such as sand or dust mixed with the fluid in the main passage 2A flows into the sub passage 24 from the sub-passage inlet 241, the pollutant substance flows toward the sub-passage outlet 242 rather than the flow rate detection passage 25. As a result, it is possible to reduce the inflow of the pollutant substance into the flow rate detection passage 25.

As shown in FIG. 2, a part of the circuit board 30 is arranged in the flow rate detection passage 25, and the flow rate detection element 41 is mounted on the part of the circuit board 30. In short, the flow rate detection element 41 is arranged in the flow rate detection passage 25, and the flow rate detection element 41 detects the flow rate of the fluid flowing through the flow rate detection passage 25. The flow rate detection element 41 is configured, for example, as a thermal type flow meter, but is not limited to this.

As shown in FIGS. 1 to 4, the temperature detection passage 26 has a temperature detection passage inlet 261 provided on one side of the measuring unit 23 in the main passage extending direction Da and a temperature detection passage outlet 262 to communicate with each other. The temperature detection passage outlet 262 is formed on the side surface of the measuring unit body 231 and the side surface of the measuring unit cover 232, thus two temperature detection passage outlets 262 are provided in total. One of the temperature detection passage outlets 262 is open to the main passage 2A to face one side in the board thickness direction Dt, and the other of the temperature detection passage outlets 262 is open to the main passage 2A to face the other side in the board thickness direction Dt. The temperature detection passage inlet 261 is open to the main passage 2A to face the one side in the main passage extending direction Da.

Therefore, a part of the fluid flowing from the one side to the other side in the main passage extending direction Da in the main passage 2A as indicated by the arrow FL1 flows into the temperature detection passage 26 from the temperature detection passage inlet 261. The fluid flows through the detection passage 26, and flows out from the temperature detection passage outlet 262 to the main passage 2A. Thus, a part of the fluid flowing through the main passage 2A flows through the temperature detection passage 26.

A part of the circuit board 30 and the temperature detection element 42 mounted on the part of the circuit board 30 are located in the temperature detection passage 26. The temperature detection element 42 detects the temperature of the fluid flowing in the temperature detection passage 26.

As shown in FIG. 2, the temperature detection passage 26 is formed as a passage independent of the sub passage 24 and the flow rate detection passage 25. Specifically, in the housing 20, the sub passage 24 and the flow rate detection passage 25 are separated from the temperature detection passage 26 by a partition wall made of resin that constitutes a part of the measuring unit 23 of the housing 20. That is, the housing 20 is configured to separate the sub passage 24 and the flow rate detection passage 25 from the temperature detection passage 26.

Figure 5:
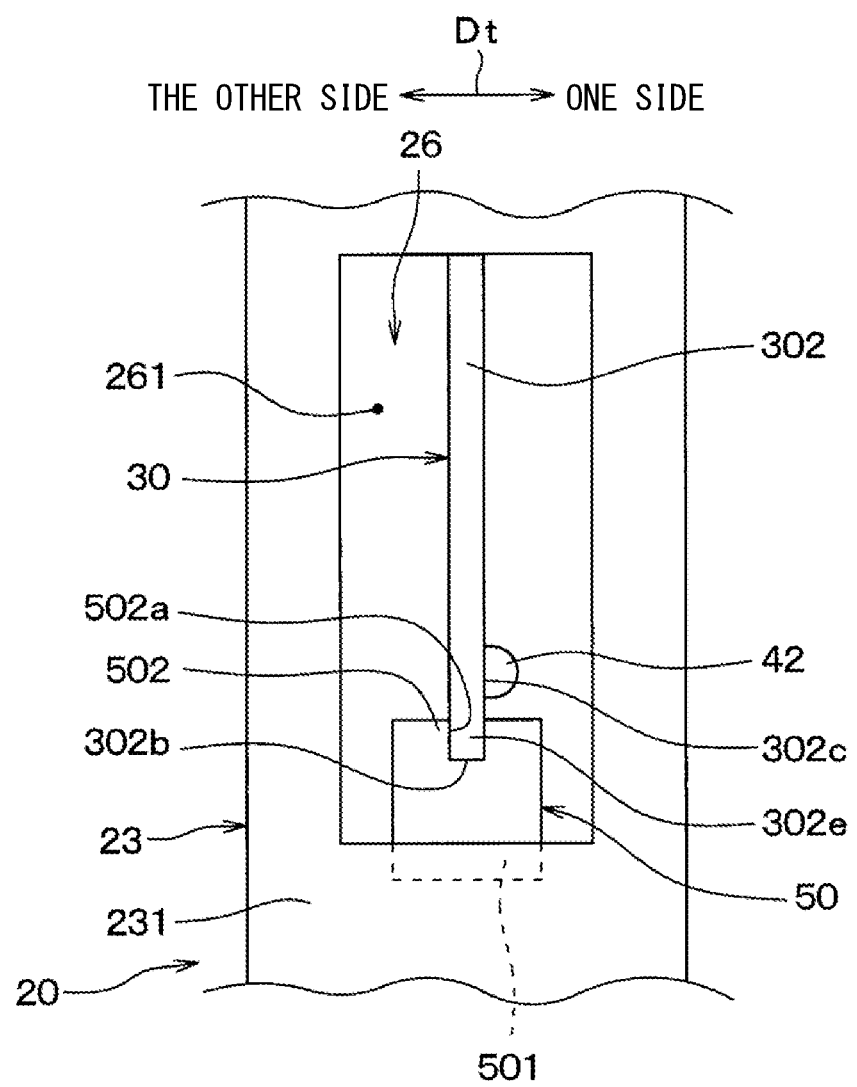
FIG. 5 is an enlarged view illustrating an area V of FIG. 1.

As shown in FIGS. 2 and 5, the circuit board 30 has a flat plate shape having a thickness in the board thickness direction Dt. The circuit board 30 is made of, for example, a glass epoxy board including a glass epoxy material as a base material. The circuit board 30 has one surface and the other surface in the board thickness direction Dt, and a wiring pattern forming an electric circuit is formed on each of the one surface and the other surface in the board thickness direction Dt. In the present embodiment, the temperature detection element 42 is mounted on the one surface of the circuit board 30 in the board thickness direction Dt, and the flow rate detection element 41 is mounted on the other surface of the circuit board 30 in the board thickness direction Dt.

The circuit board 30 is shaped to have a body portion 301 fixed to the measuring unit 23 of the housing 20 and a protrusion 302 extended to project from the body portion 301. The flow rate detection element 41 and electric parts for processing the detection signals of the detection elements 41 and 42 are mounted and fixed on the body portion 301.

The protrusion 302 of the circuit board 30 extends from the body portion 301 along a protrusion extending direction Dst. The protrusion extending direction Dst may be a linear direction, but in the present embodiment, the protrusion extending direction Dst is a curved direction. The protrusion 302 has a base end 302a connected to the body portion 301 and a tip end 302b provided on the opposite side of the base end 302a in the protrusion extending direction Dst.

Figure 6:
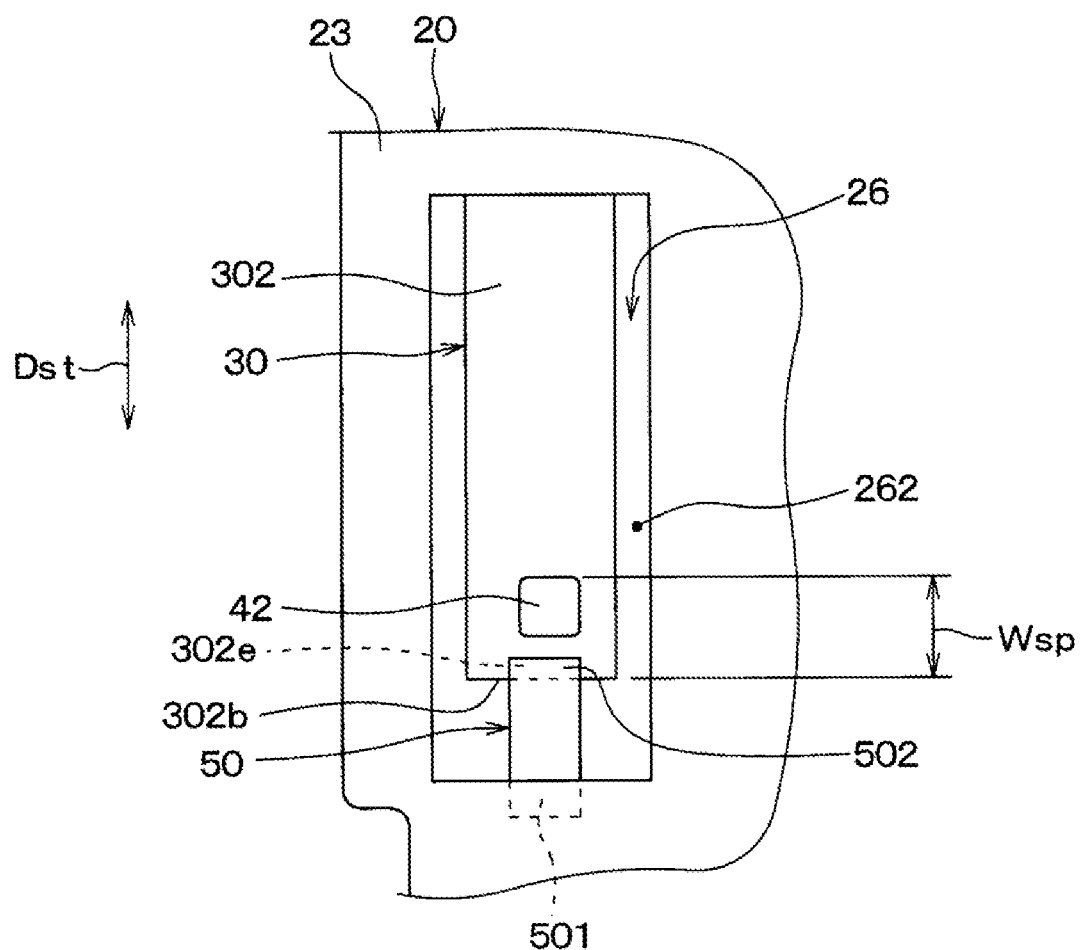
FIG. 6 is an enlarged view illustrating an area VI of FIG. 3.

As shown in FIGS. 5 and 6, the temperature detection element 42 is mounted and fixed on the protrusion 302. That is, the protrusion 302 includes an element fix portion 302c to which the temperature detection element 42 is fixed. The element fix portion 302c is positioned adjacent to the tip end 302b of the protrusion 302.

As shown in FIG. 2, the protrusion 302 has a base-side fix portion 302d located adjacent to the base end 302a. The base-side fix portion 302d may include the base end 302a of the protrusion 302. The base-side fix portion 302d is sandwiched between the measuring unit body 231 and the measuring unit cover 232 together with the body portion 301, thereby fixed to the measuring unit 23. A portion of the protrusion 302 between the tip end 302b and the base-side fix portion 302d projects into the temperature detection passage 26 from the base-side fix portion 302d.

As shown in FIGS. 5 and 6, the protrusion 302 of the circuit board 30 has a supported portion 302e that is a part of the tip end 302b, and the supported portion 302e is supported by the housing 20. The supported portion 302e is located between the tip end 302b and the base-side fix portion 302d in the protrusion extending direction Dst. In the present embodiment, the supported portion 302e includes the tip end 302b of the protrusion 302.

The supported portion 302e is provided within a predetermined supported range Wsp of the protrusion 302. The supported range Wsp includes the position of the element fix portion 302c to which the temperature detection element is fixed, and extends from the position of the element fix portion 302c to the tip end 302b of the protrusion 302 along the protrusion extending direction Dst. The supported portion 302e is supported by the measuring unit 23 of the housing 20 so that the displacement of the element fix portion 302c in the board thickness direction Dt is suppressed.

Specifically, in the present embodiment, an interposition part 50 is interposed between the supported portion 302e and the measuring unit 23 as a component different from the housing 20. Therefore, the measuring unit 23 of the housing 20 supports the supported portion 302e through the interposition part 50. The interposition part 50 may be made of the same material as the measuring unit body 231 of the housing 20, or may be made of a material different from the measuring unit body 231.

For example, the measuring unit body 231 of the housing 20 is formed by insert molding using the interposition part 50 as an insert. Thus the interposition part 50 is fixed to the housing 20.

As shown in FIGS. 5 and 6, the interposition part 50 has a first contact part 501 as one end and a second contact part 502 as the other end. The first contact part 501 is in contact with the measuring unit 23 of the housing 20 and is fixed to the measuring unit 23. The second contact part 502 is in contact with the supported portion 302e of the protrusion 302 of the circuit board 30. The first contact part 501 and the second contact part 502 are positioned side by side in the protrusion extending direction Dst, and the second contact part 502 is provided to face the protrusion 302 with respect to the first contact part 501.

In the present embodiment, the second contact part 502 has a fitting groove 502a cut in a direction orthogonal to the board thickness direction Dt. The supported portion 302e of the protrusion 302 is fitted into the fitting groove 502a, so that the interposition part 50 restrains the position of the supported portion 302e in the board thickness direction Dt.

According to the present embodiment, the supported portion 302e of the protrusion 302 within the supported range Wsp of FIG. 6 is supported by the housing 20 to suppress the displacement of the element fix portion 302c in the board thickness direction Dt. As a result, the protrusion 302 of the circuit board 30 is supported by at the both ends or a supporting structure close thereto. Therefore, when the flow rate detector 10 vibrates, the bending deformation of the protrusion 302 due to the vibration is suppressed as compared with the conventional structure of the physical quantity detector. Therefore, as compared with the conventional structure, the earthquake resistance of the flow rate detector 10 is enhanced, and the possibility that the protrusion 302 of the circuit board 30 is damaged due to vibration can be reduced. For example, it is possible to restrict damage of the circuit board 30 due to vibration of the engine of the vehicle in which the flow rate detector 10 of the present embodiment is mounted.

Since the temperature detection element 42 has a mass, when the supported portion 302e is within the supported range Wsp in FIG. 6, it is more effective in suppressing the vibration of the protrusion 302 than in a case where the supported portion 302e is located adjacent to the base end 302a (see FIG. 2) outside the supported range Wsp.

According to the present embodiment, as shown in FIGS. 5 and 6, the interposition part 50 is configured as a component separate from the housing 20. Since the resin component including the measuring unit body 231 has a relatively large volume in the flow rate detector 10, the molding die of the resin component including the measuring unit body 231 is also a large mold. In this case, it takes a lot of man-hours to change the shape of the mold. According to the present embodiment, since the interposition part 50 is provided, even if the supported portion 302e of the circuit board 30 or the peripheral portion thereof is changed in shape, the change in the shape of the supported portion 302e does not affect the shape of the measuring unit body 231. In that case, it is possible to deal with this by changing the shape of the interposition part 50 having a small volume. Therefore, when the shape of the supported portion 302e or the peripheral portion of the circuit board 30 is changed, it is possible to reduce the man-hours required for changing the shape of the component mold.

According to the present embodiment, as shown in FIG. 2, the housing 20 is configured to separate the sub passage 24 and the flow rate detection passage 25 from the temperature detection passage 26. Therefore, it is possible to restrict the air flow in the flow rate detection passage 25 from being disturbed by the temperature detection passage 26. Accordingly, it is possible to improve the flow rate detection accuracy of the flow rate detection element 41 arranged in the flow rate detection passage 25.

Second Embodiment

A second embodiment of the present disclosure is described next. The present embodiment will be explained with respect to portions different from those of the first embodiment. In addition, explanations of the same or equivalent portions as those in the above embodiment will be omitted or simplified. The same applies to a description of embodiments as described later.

Figure 7:
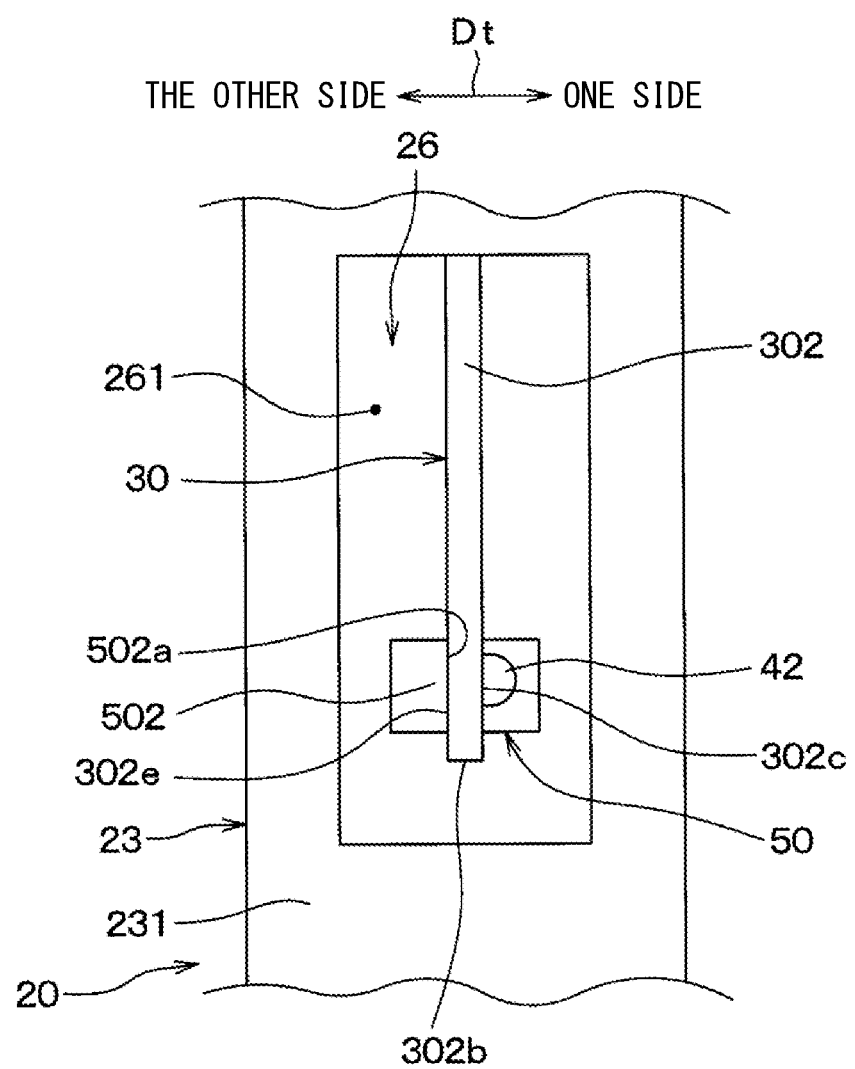
FIG. 7 is an enlarged view illustrating a portion, corresponding to the area V of FIG. 1, of a flow rate detector according to a second embodiment, corresponding to FIG. 5.
Figure 8:
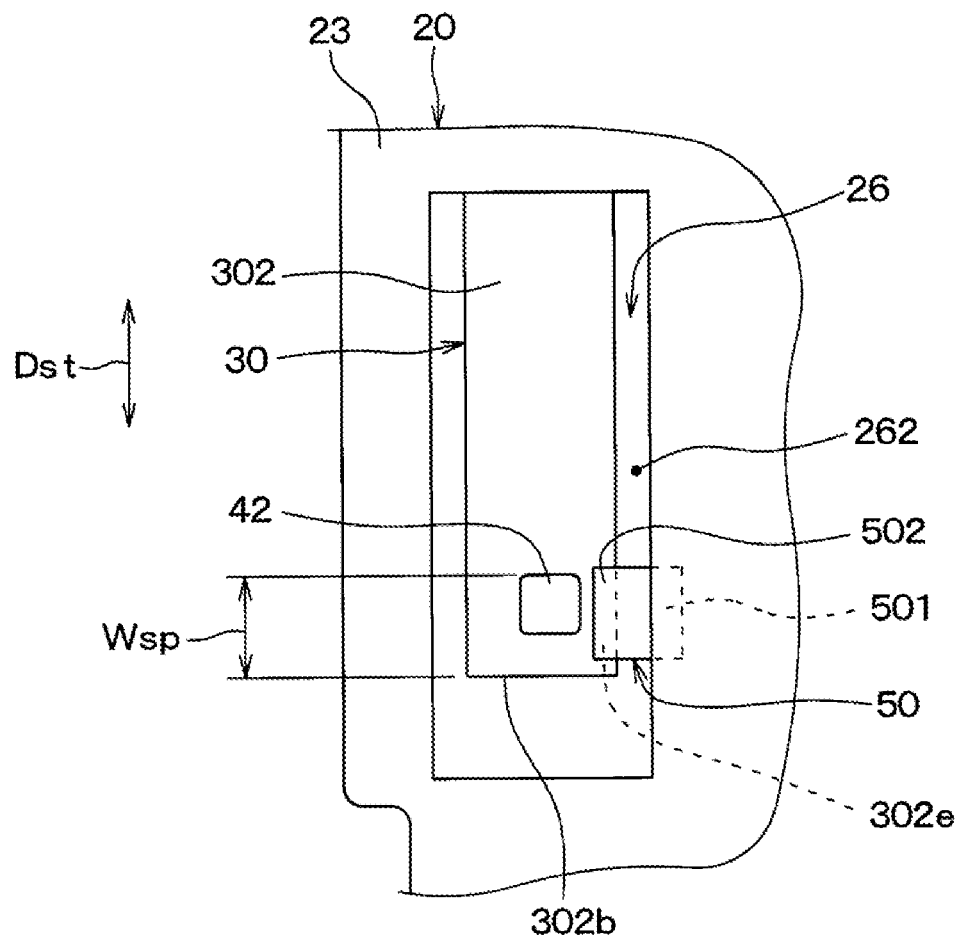
FIG. 8 is an enlarged view illustrating a portion, corresponding to the area VI of FIG. 3, of the flow rate detector of the second embodiment, corresponding to FIG. 6.

As shown in FIGS. 7 and 8, the supported range Wsp of this embodiment is defined similarly to the first embodiment. Also in the present embodiment, similarly to the first embodiment, the supported portion 302e within the supported range Wsp is supported by the housing 20 so that the displacement of the element fix portion 302c in the board thickness direction Dt is suppressed. However, in this embodiment, the arrangement and posture of the interposition part 50 are different from those in the first embodiment.

Specifically, the interposition part 50 is arranged such that the first contact part 501 and the second contact part 502 are aligned in a direction intersecting the board thickness direction Dt and the protrusion extending direction Dst.

Aside from the above described aspects, the present embodiment is the same as the first embodiment. Further, in the present embodiment, the same effects as the first embodiment described above can be obtained in the same manner as in the first embodiment.

Third Embodiment

A third embodiment is described next. The present embodiment will be explained with respect to portions different from those of the first embodiment.

Figure 9:
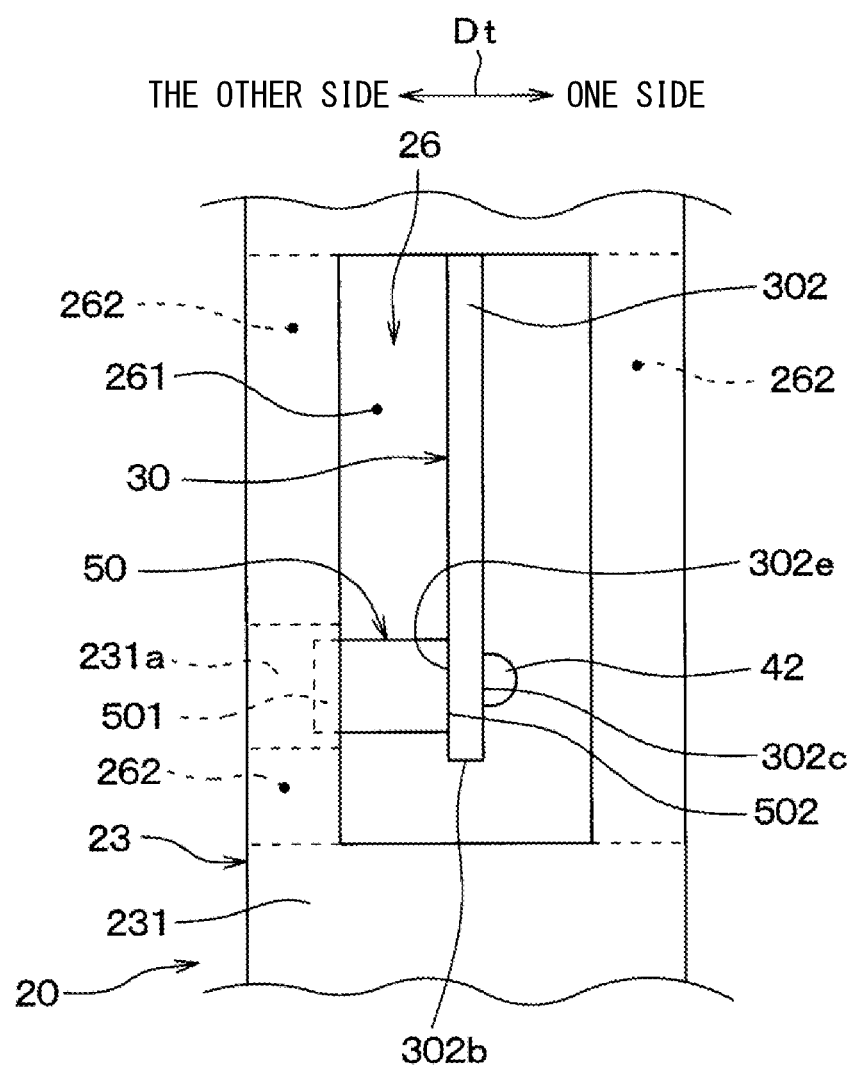
FIG. 9 is an enlarged view illustrating a portion, corresponding to the area V of FIG. 1, of a flow rate detector according to a third embodiment, corresponding to FIG. 5.
Figure 10:
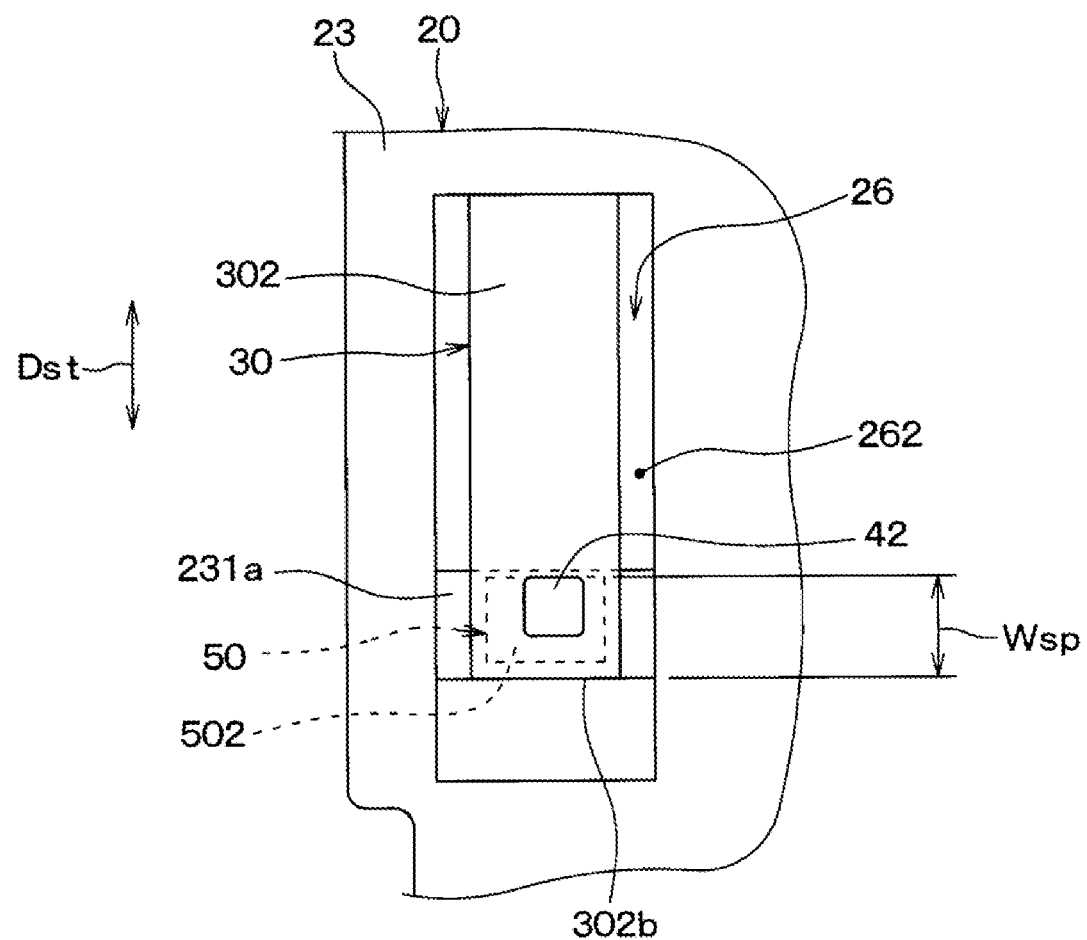
FIG. 10 is an enlarged view illustrating a portion, corresponding to the area VI of FIG. 3, of the flow rate detector of the third embodiment, corresponding to FIG. 6.

As shown in FIGS. 9 and 10, the supported range Wsp of this embodiment is defined similarly to the first embodiment. Also in the present embodiment, similarly to the first embodiment, the supported portion 302e within the supported range Wsp is supported by the housing 20 so that the displacement of the element fix portion 302c in the board thickness direction Dt is suppressed. However, in this embodiment, the arrangement and posture of the interposition part 50 are different from those in the first embodiment.

Specifically, in the present embodiment, the measuring unit body 231 has an outlet division section 231a arranged on the other side in the board thickness direction Dt with respect to the element fix portion 302c of the circuit board 30. The outlet division section 231a is provided so as to divide the temperature detection passage outlet 262 arranged on the other side of the protrusion 302 in the board thickness direction Dt into two holes.

Further, the interposition part 50 is arranged such that the first contact part 501 and the second contact part 502 are arranged side by side in the board thickness direction Dt. The second contact part 502 is arranged on one side of the first contact part 501 in the board thickness direction Dt and is fixed to the supported portion 302e of the protrusion 302 by, for example, adhesion. Further, the first contact part 501 is fixed to the outlet division section 231a of the housing 20.

Aside from the above described aspects, the present embodiment is the same as the first embodiment. Further, in the present embodiment, the same effects as the first embodiment described above can be obtained in the same manner as in the first embodiment.

Fourth Embodiment

A fourth embodiment is described next. The present embodiment will be explained with respect to portions different from those of the first embodiment.

Figure 11:
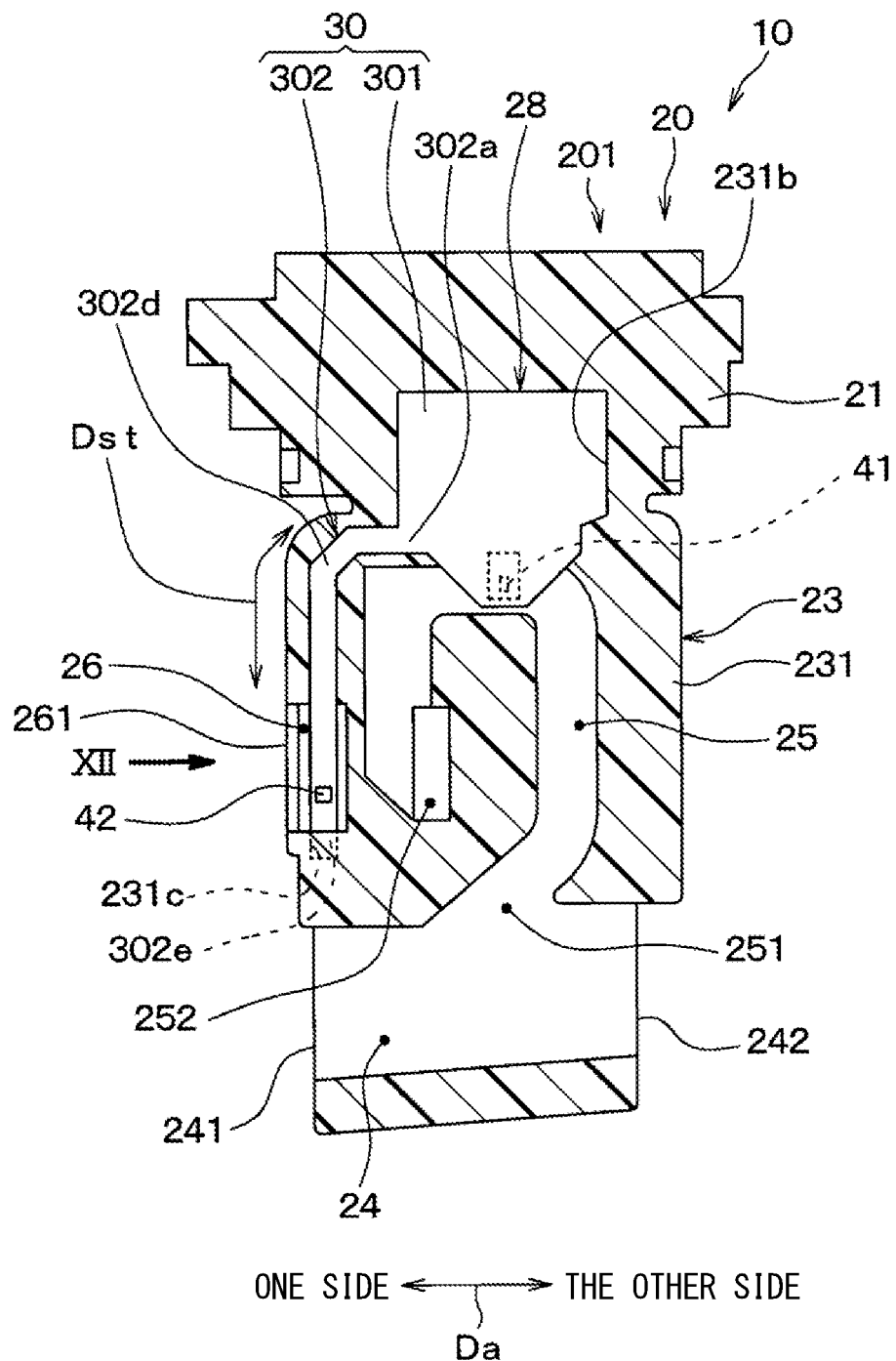
FIG. 11 is a cross-sectional view, corresponding to the line II-II of FIG. 1, of a flow rate detector according to a fourth embodiment, corresponding to FIG. 2.
Figure 12:
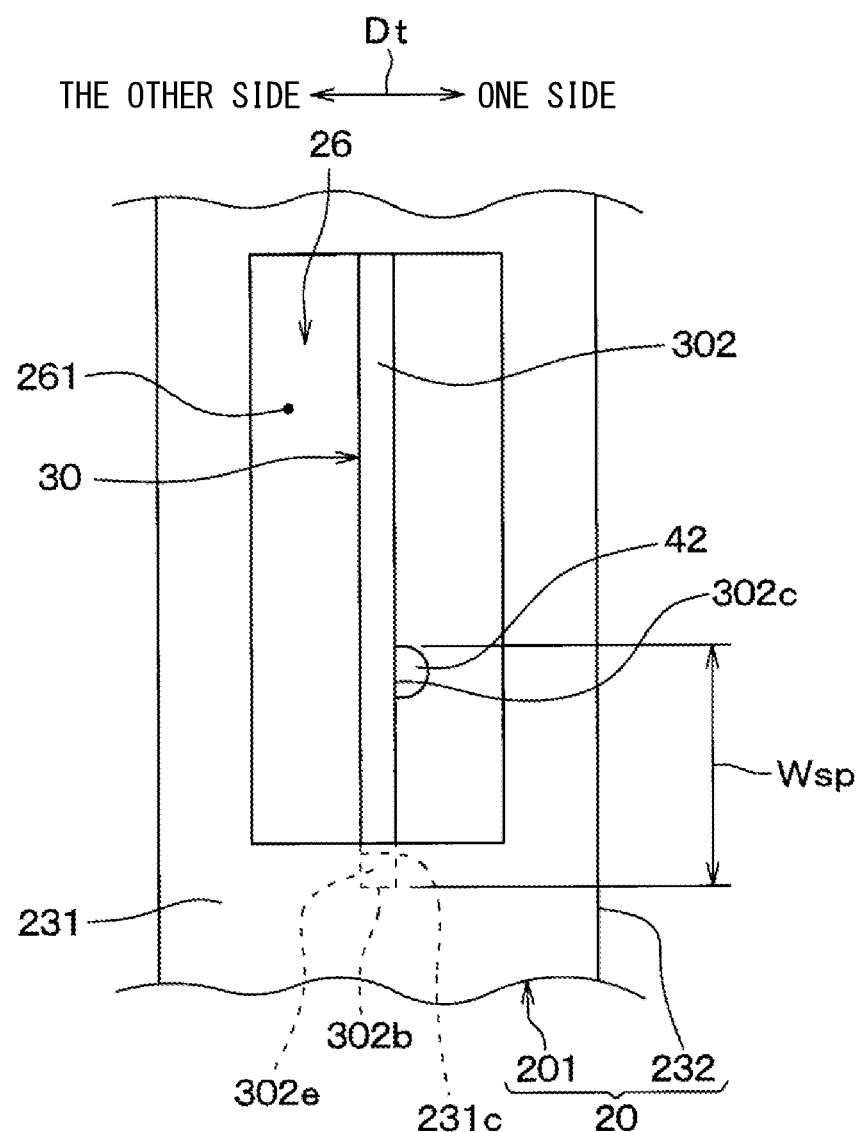
FIG. 12 is an enlarged view illustrating a portion, corresponding to the area V of FIG. 1, of the flow rate detector of the fourth embodiment, and is also a view seen in an arrow direction XII of FIG. 11, corresponding to FIG. 5.

As shown in FIGS. 11 and 12, in the present embodiment, the interposition part 50 (see FIG. 5) is not provided, and the supported portion 302e of the circuit board 30 is in direct contact with the housing 20. The supported portion 302e is directly fixed to the housing 20.

As in the first embodiment, the housing 20 in this embodiment has the housing body 201 that is configured as a single component. The housing body 201 includes the flange portion 21, the external connection portion 22, and the measuring unit body 231. Therefore, the housing 20 is composed of the housing body 201 and the measuring unit cover 232.

For example, the housing body 201 is a resin-made one-piece component formed by injection molding or the like. Since the housing body 201 includes the measuring unit body 231, the housing body 201 includes a body fix part 231b to which the body portion 301 is fixed. The body fix part 231b is a part of the measuring unit body 231.

However, unlike the first embodiment, the housing body 201 of the present embodiment includes not only the body fix part 231b but also the support part 231c that is a part of the measuring unit body 231 to support the tip end of the circuit board 30. The support part 231c is in contact with the supported portion 302e of the protrusion 302 including the tip end 302b so as to support the supported portion 302e. For example, the supported portion 302e is fixed to the support part 231c in a state of being fitted into the support part 231c. As a result, the support part 231c restrains the position of the supported portion 302e in the board thickness direction Dt.

As described above, according to the present embodiment, the housing body 201 configured as a single component includes not only the body fix part 231b to which the body portion 301 is fixed but also the support part 231c that supports the supported portion 302e of the protrusion 302. Therefore, the support part 231c can be molded simultaneously with the body fix part 231b, and the manufacturing time for manufacturing the flow rate detector 10 can be shortened.

Aside from the above described aspects, the present embodiment is the same as the first embodiment. Further, in the present embodiment, the same effects as the first embodiment described above can be obtained in the same manner as in the first embodiment.

Fifth Embodiment

A fifth embodiment is described next. The present embodiment will be explained with respect to portions different from those of the first embodiment.

Figure 13:
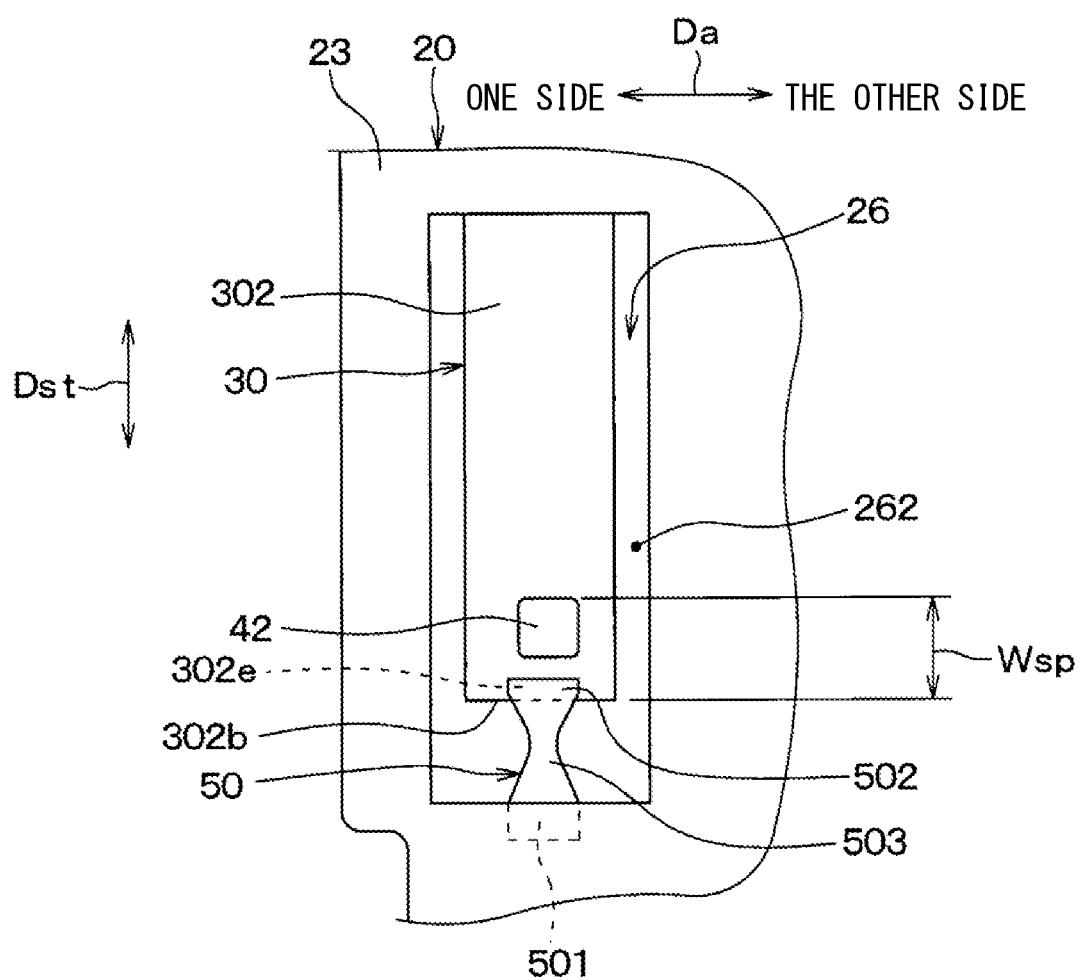
FIG. 13 is an enlarged view illustrating a portion, corresponding to the area VI of FIG. 3, of a flow rate detector according to a fifth embodiment, corresponding to FIG. 6.

As shown in FIG. 13, in the present embodiment, the interposition part 50 has a constricted portion 503 between the first contact part 501 and the second contact part 502. The constricted portion 503 has a partially constricted shape between the first contact part 501 and the second contact part 502. For example, the constricted portion 503 is not constricted in the board thickness direction Dt (see FIG. 5), but constricted in the direction orthogonal to the board thickness direction Dt (specifically, the main passage extending direction Da).

Since the interposition part 50 has the constricted portion 503, the interposition part 50 has a shape in which the cross-sectional area of the interposition part 50 is partially reduced between the first contact part 501 and the second contact part 502. The cross-sectional area of the interposition part 50 is defined by cutting the interposition part 50 on an imaginary plane orthogonal to an axis connecting the first contact part 501 and the second contact part 502.

Since the interposition part 50 has the constricted portion 503 as described above, the heat transfer between the temperature detection element 42 and the housing 20 through the interposition part 50 can be suppressed by the constricted portion 503, compared to a case where the interposition part 50 does not have the constricted portion 503. Thereby, it is possible to improve the temperature detection accuracy of the temperature detection element 42.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second embodiment or the third embodiment.

Sixth Embodiment

A sixth embodiment is described next. The present embodiment will be explained with respect to portions different from those of the first embodiment.

In this embodiment, the interposition part 50 shown in FIGS. 5 and 6 has higher flexibility than the housing 20. In this respect, the present embodiment is different from the first embodiment.

For example, since the interposition part 50 is connected to the measuring unit body 231 of the housing 20, the interposition part 50 has higher flexibility than the measuring unit body 231. The interposition part 50 of the present embodiment is made of, for example, a flexible material such as rubber having a smaller elastic coefficient than that of the housing 20.

Since the interposition part 50 of the present embodiment has high flexibility, a strain difference generated between the protrusion 302 of the circuit board 30 and the housing 20 can be absorbed by the interposition part 50 when the temperature of the flow rate detector 10 changes. The thermal stress is generated near the element fix portion 302c of the circuit board 30 due to the expansion and contraction of the resin constituting the housing 20 when the temperature changes. However, the thermal stress can be reduced compared to a case where, for example, the interposition part 50 has the same rigidity as the housing 20. As a result, it is possible to restrict damage to the substrate assembly 28 due to the thermal stress.

Aside from the above described aspects, the present embodiment is the same as the first embodiment. Further, in the present embodiment, the same effects as the first embodiment described above can be obtained in the same manner as in the first embodiment.

The present embodiment is a modification based on the first embodiment, but the present embodiment can be combined with the second embodiment, the third embodiment, or the fifth embodiment.

Seventh Embodiment

A seventh embodiment is described next. The present embodiment will be explained with respect to portions different from those of the first embodiment.

Figure 14:
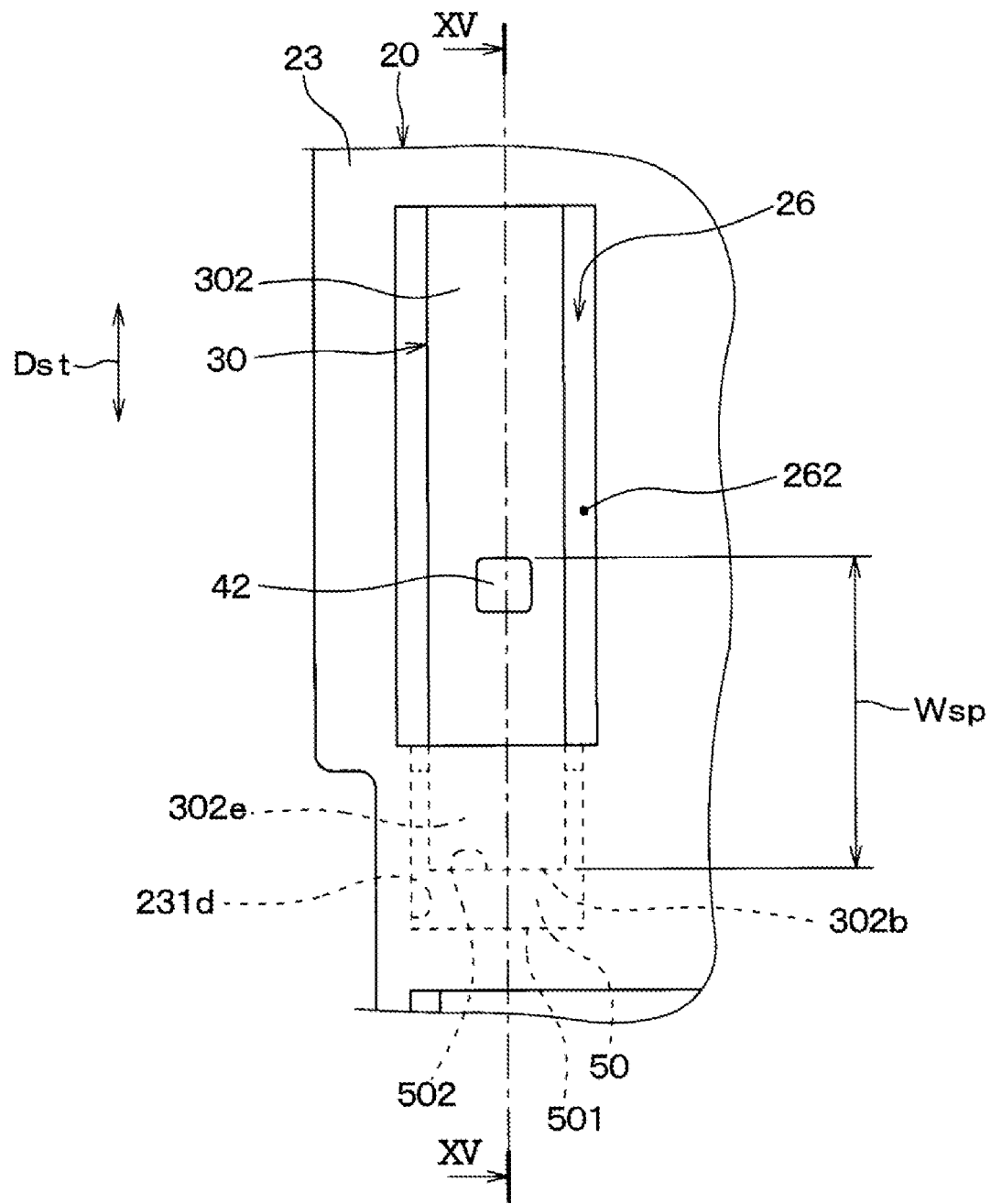
FIG. 14 is an enlarged view illustrating a portion, corresponding to the area VI of FIG. 3, of a flow rate detector according to a seventh embodiment, corresponding to FIG. 6.
Figure 15:
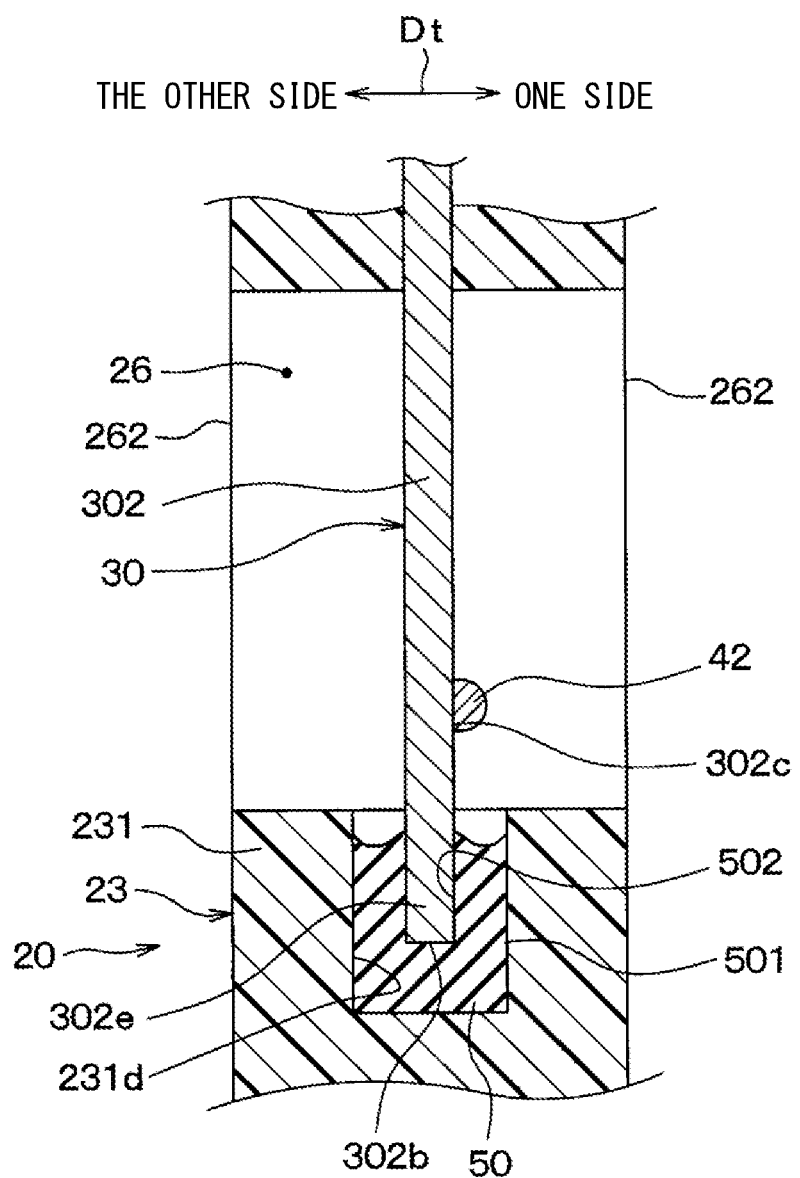
FIG. 15 is a cross-sectional view taken along a line XV-XV of FIG. 14 in the seventh embodiment.

As shown in FIGS. 14 and 15, in the present embodiment, the arrangement and the configuration of the interposition part 50 are different from those in the first embodiment.

Specifically, in the present embodiment, the measuring unit body 231 has a board insertion hole 231d that is a blind hole open toward the temperature detection passage 26. The supported portion 302e of the protrusion 302 including the tip end 302b is inserted into the board insertion hole 231d.

The supported portion 302e that faces the board insertion hole 231d is not in contact with an inner wall surface of the board insertion hole 231d. The interposition part 50 is interposed between the inner wall surface of the board insertion hole 231d and the supported portion 302e over the entire circumference of the supported portion 302e. Therefore, the measuring unit body 231 of the housing 20 is configured to support the supported portion 302e through the interposition part 50.

Moreover, the interposition part 50 has high flexibility as compared with the housing 20 (for example, the measuring unit body 231 of the housing 20) as in the sixth embodiment.

For example, when forming the interposition part 50 of the present embodiment, first, a liquid resin which is a material of the interposition part 50 is poured into the board insertion hole 231d in a state where the supported portion 302e of the protrusion 302 is inserted into the board insertion hole 231d. Then, the poured liquid resin is solidified in the board insertion hole 231d, so that the interposition part 50 of the present embodiment is completed. The solidified resin material forming the interposition part 50 has a smaller elastic coefficient than the housing 20.

The material of the interposition part 50 does not need to be completely solidified. For example, the interposition part 50 may be gel-like to the extent that the interposition part 50 is retained in the board insertion hole 231d without flowing out from the board insertion hole 231d.

Aside from the above described aspects, the present embodiment is the same as the first embodiment. Further, in the present embodiment, the same effects as the first embodiment described above can be obtained in the same manner as in the first embodiment.

Since the interposition part 50 of the present embodiment also has a configuration common to the sixth embodiment, the same effects as the sixth embodiment can be obtained from the configuration common to the sixth embodiment.

Eighth Embodiment

An eighth embodiment is described next. The present embodiment will be explained with respect to portions different from those of the first embodiment.

In the present embodiment, the interposition part 50 shown in FIGS. 5 and 6 has a higher heat insulating property than the housing 20. In this respect, the present embodiment is different from the first embodiment.

For example, since the interposition part 50 is connected to the measuring unit body 231 of the housing 20, the interposition part 50 has a higher heat insulating property than the measuring unit body 231. The interposition part 50 of the present embodiment is made of, for example, a material such as resin having a smaller thermal conductivity than the housing 20. The interposition part 50 may be made of, for example, a foamed resin or the like.

Since the interposition part 50 of the present embodiment has high heat insulation as described above, the heat transfer between the temperature detection element 42 and the housing 20 through the interposition part 50 can be suppressed by the interposition part 50, compared with a case where the heat insulating property of the interposition part 50 is lower. Thereby, it is possible to improve the temperature detection accuracy of the temperature detection element 42.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the second, third, fifth, sixth or seventh embodiment.

Ninth Embodiment

A ninth embodiment is described next. The present embodiment will be explained with respect to portions different from those of the first embodiment.

Figure 16:
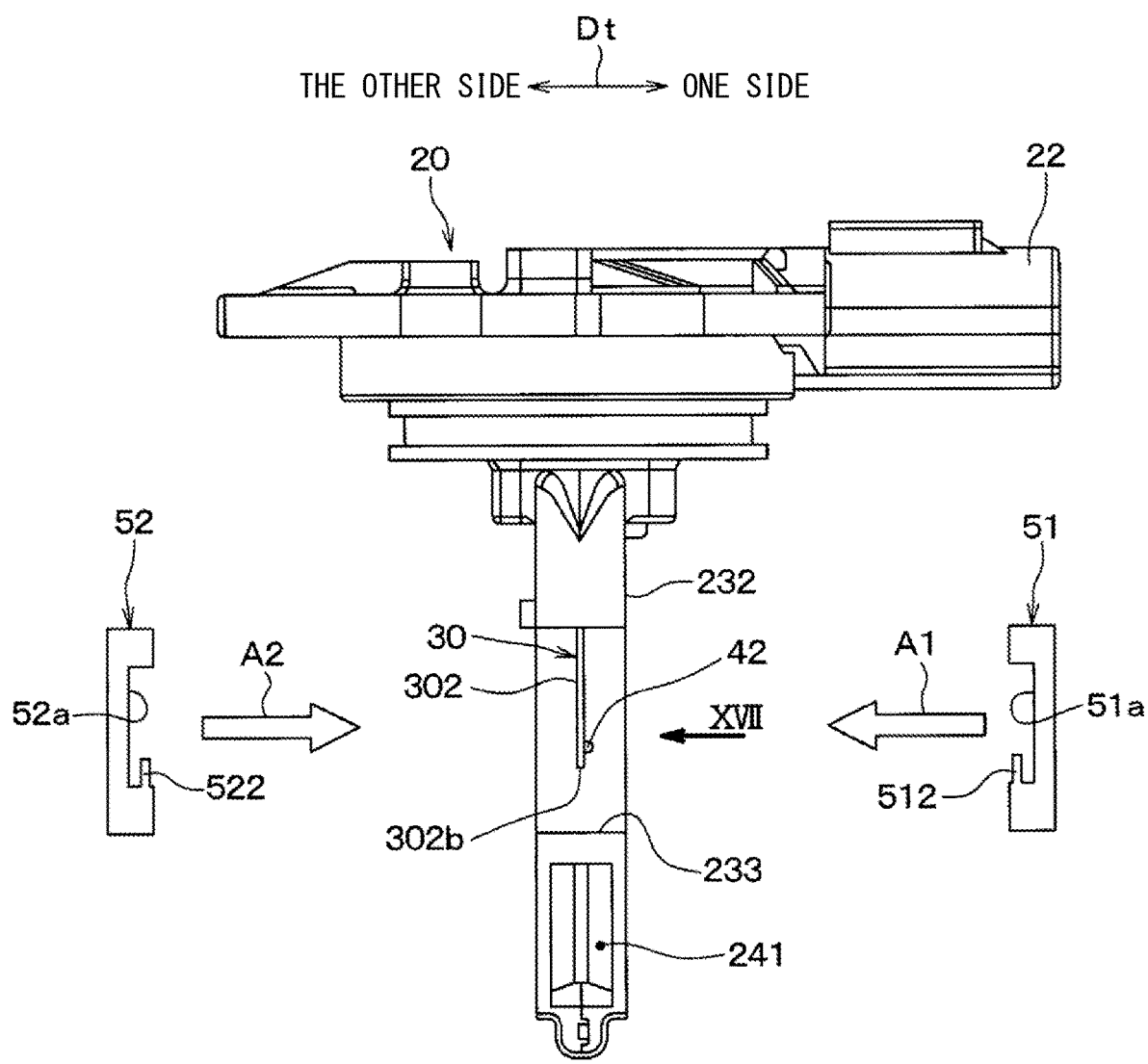
FIG. 16 is an exploded view illustrating a flow rate detector according to a ninth embodiment, which includes a first interposition member and a second interposition member, seen in an extending direction of a main passage, similarly to FIG. 1.
Figure 17:
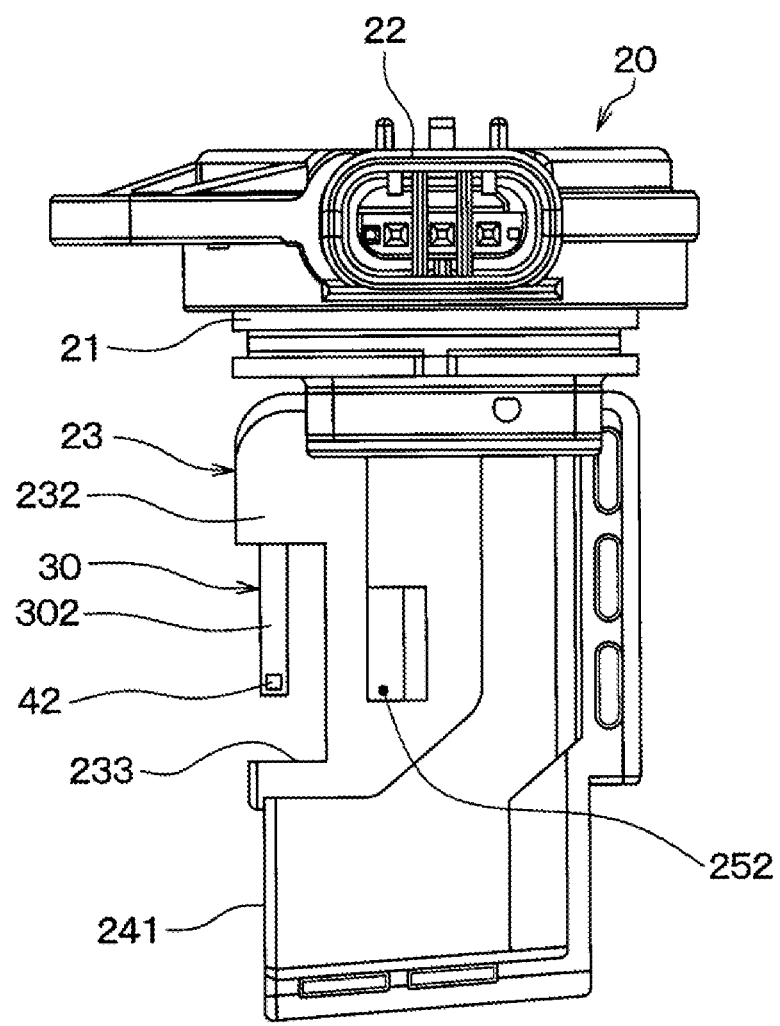
FIG. 17 is a side view illustrating the flow rate detector of the ninth embodiment seen in an arrow direction XVII of FIG. 16, in which the first interposition member and the second interposition member are omitted.

As shown in FIGS. 16 and 17, in the present embodiment, the measuring unit 23 of the housing 20 has a housing groove portion 233 shaped in a groove that is cut from one side in the main passage extending direction Da and that passes through in the board thickness direction Dt. The protrusion 302 of the circuit board 30 projects into the housing groove portion 233, and the temperature detection element 42 is arranged in the housing groove portion 233.

Figure 18:
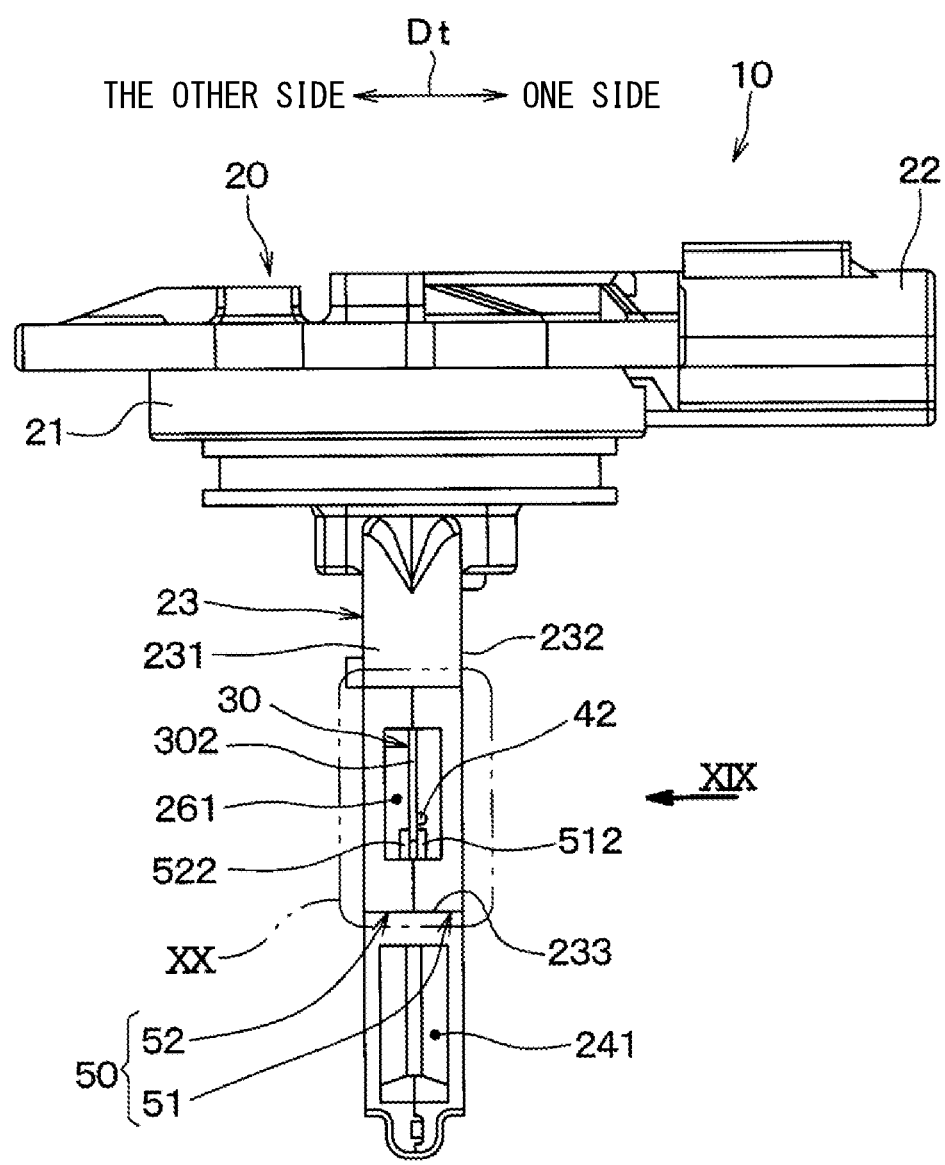
FIG. 18 is a side view illustrating the flow rate detector of the ninth embodiment, seen in an extending direction of a main passage, similarly to FIG. 1.
Figure 19:
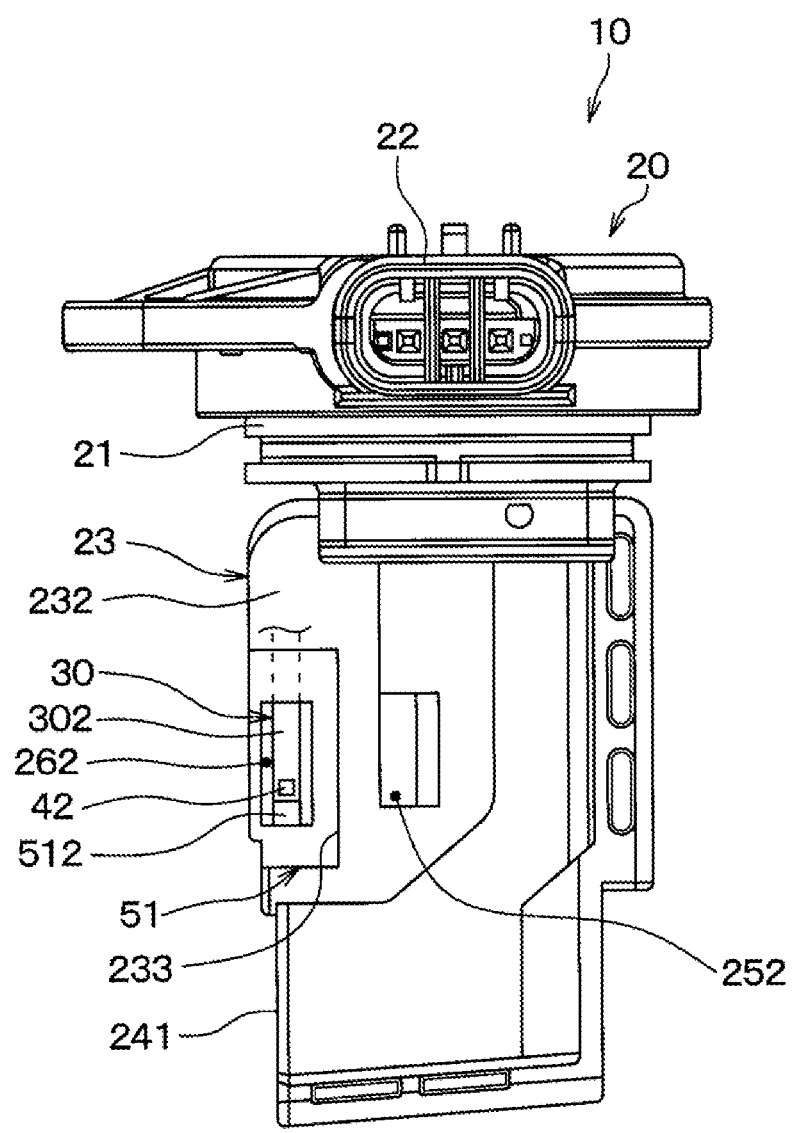
FIG. 19 is a side view illustrating the flow rate detector of the ninth embodiment, seen in an arrow direction XIX of FIG. 18, corresponding to FIG. 3.
Figure 20:
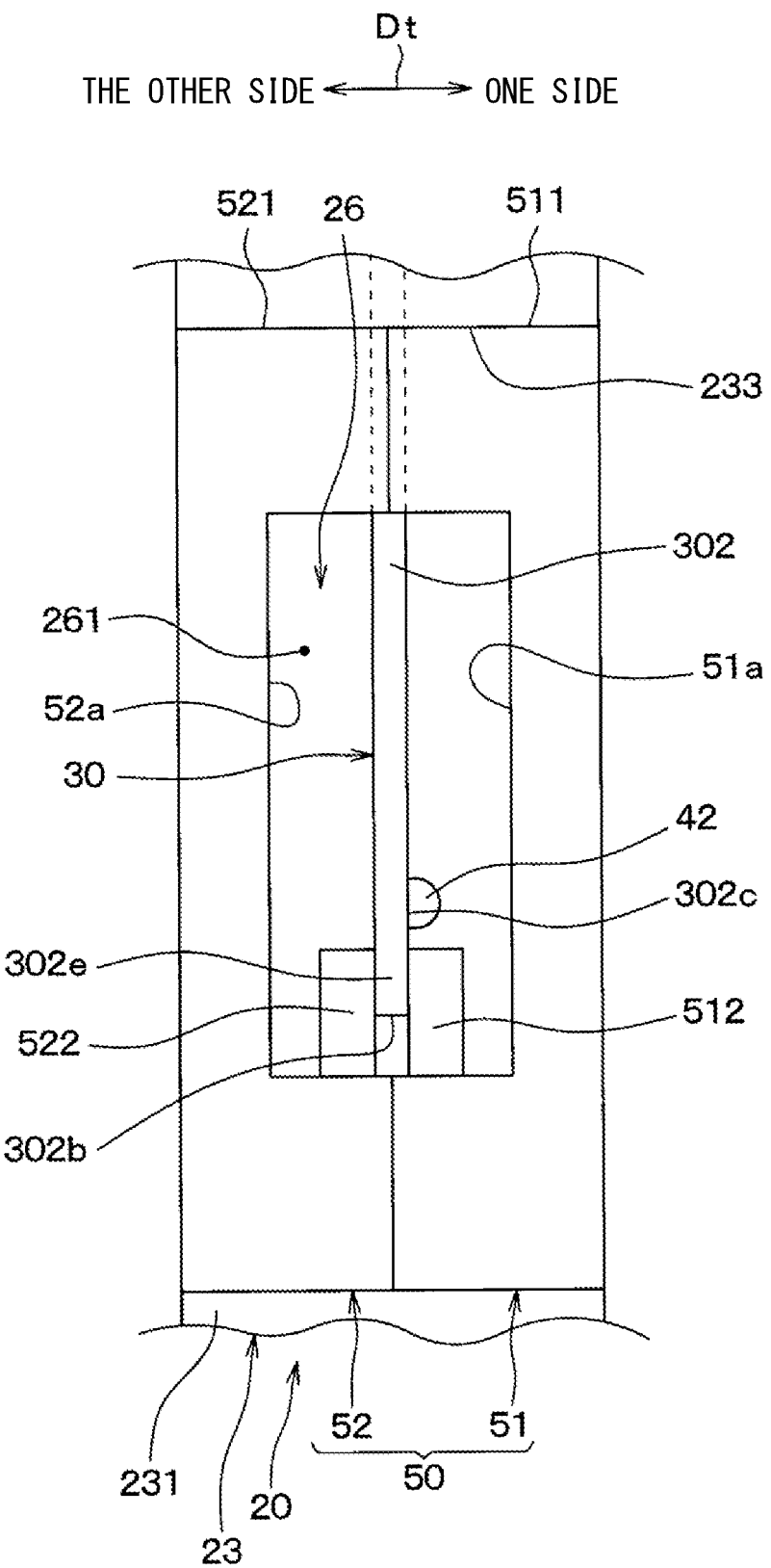
FIG. 20 is an enlarged view illustrating an area XX of FIG. 18 in the ninth embodiment, corresponding to FIG. 5.

As shown in FIGS. 18 to 20, the flow rate detector 10 includes a first interposition member 51 and a second interposition member 52. The first interposition member 51 and the second interposition member 52 are fitted into the housing groove portion 233 and fixed to the measuring unit 23 of the housing 20 in the housing groove portion 233.

The first interposition member 51 and the second interposition member 52 form the interposition part 50 that supports the supported portion 302e of the protrusion 302 by being integrated with each other while being fitted in the housing groove portion 233. Therefore, the interposition part 50 of the present embodiment is also configured as a component separate from the housing 20.

The first interposition member 51 is provided on one side of the protrusion 302 in the board thickness direction Dt, and the second interposition member 52 is provided on the other side of the protrusion 302 in the board thickness direction Dt.

As shown in FIG. 16, the first interposition member 51 is fitted into the housing groove portion 233 from one side in the board thickness direction Dt as shown by an arrow A1 and is fixed to the housing groove portion 233. The second interposition member 52 is fitted into the housing groove portion 233 from the other side in the board thickness direction Dt as shown by an arrow A2, and is fixed to the housing groove portion 233. The first interposition members 51, the second interposition member 52 and the housing groove portion 233 are fixed with each other by, for example, adhesion, snap fit, welding, or the like.

As shown in FIGS. 18 to 20, in the present embodiment, the temperature detection passage 26, the temperature detection passage inlet 261 and the two temperature detection passage outlets 262 are provided in the interposition part 50 composed of the first interposition member 51 and the second interposition member 52. Specifically, the temperature detection passage 26 is formed inside the interposition part 50, and the temperature detection element 42 is located in the temperature detection passage 26. One of the temperature detection passage outlets 262 is formed on the first interposition member 51, and the other is formed on the second interposition member 52. The first interposition member 51 and the second interposition member 52 have an inlet groove 51a and an inlet groove 52a, respectively, facing in the board thickness direction Dt. The inlet groove 51a and the inlet groove 52a are connected with facing each other, to form the temperature detection passage inlet 261 as one hole.

The outer shape of the first interposition member 51, the second interposition member 52 and the housing 20 combined with each other is the same as the outer shape of the housing 20 of the first embodiment.

The first interposition member 51 has a first housing-side contact part 511 in contact with the housing groove portion 233 on the peripheral edge of the first interposition member 51. The second interposition member 52 has a second housing-side contact part 521 in contact with the housing groove portion 233 on the peripheral edge of the second interposition member 52. The first housing-side contact part 511 and the second housing-side contact part 521 correspond to the first contact part 501 (see FIG. 5) in contact with the housing 20.

The first interposition member 51 has a first board-side contact part 512 protruding into the temperature detection passage 26. The second interposition member 52 has a second board-side contact part 522 protruding into the temperature detection passage 26. The first board-side contact part 512 and the second board-side contact part 522 are arranged side by side in the board thickness direction Dt through the supported portion 302e of the protrusion 302. The first board-side contact part 512 and the second board-side contact part 522 are in contact with the supported portion 302e. Therefore, the first board-side contact part 512 and the second board-side contact part 522 correspond to the second contact part 502 (see FIG. 5) in contact with the supported portion 302e.

Aside from the above described aspects, the present embodiment is the same as the first embodiment. Further, in the present embodiment, the same effects as the first embodiment described above can be obtained in the same manner as in the first embodiment.

Note that the present embodiment is a modification based on the first embodiment, but it is possible to combine the present embodiment with the sixth embodiment or the eighth embodiment.

Tenth Embodiment

A tenth embodiment is described next. The present embodiment will be explained with respect to portions different from those of the ninth embodiment.

Figure 21:
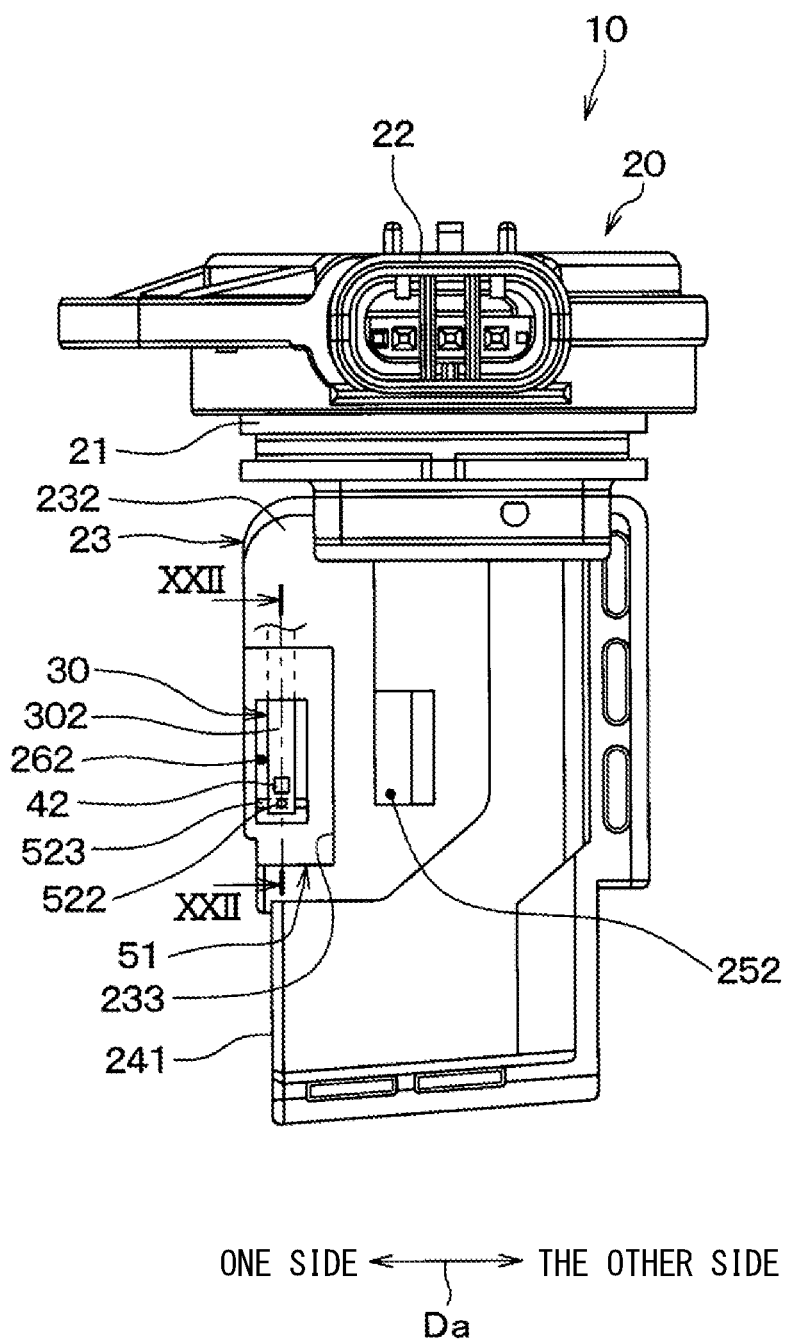
FIG. 21 is a side view illustrating a flow rate detector according to a tenth embodiment, seen in the same direction as in FIG. 19.
Figure 22:
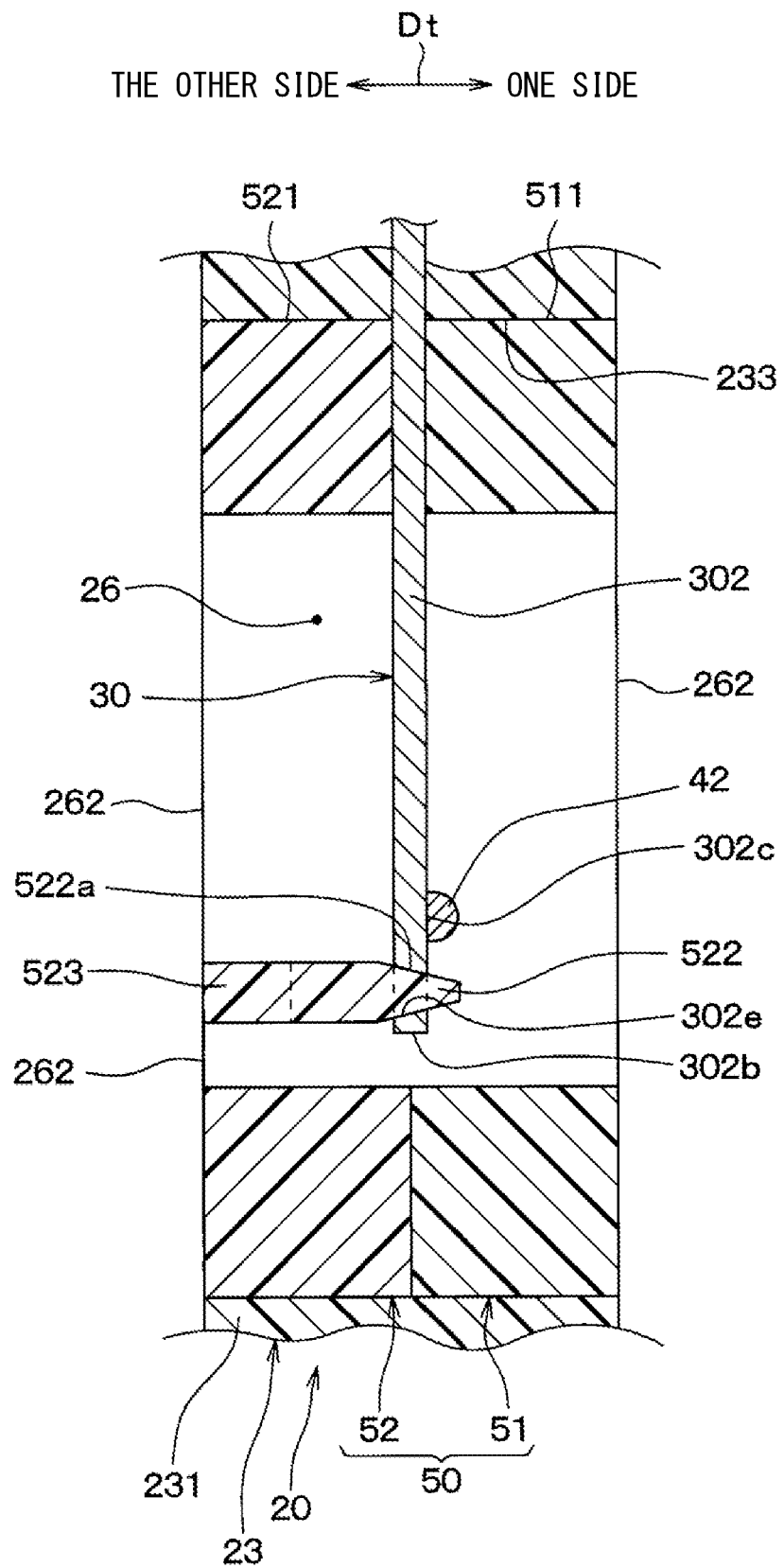
FIG. 22 is a cross-sectional view taken along a line XXII-XXII of FIG. 21 in the tenth embodiment.
Figure 23:
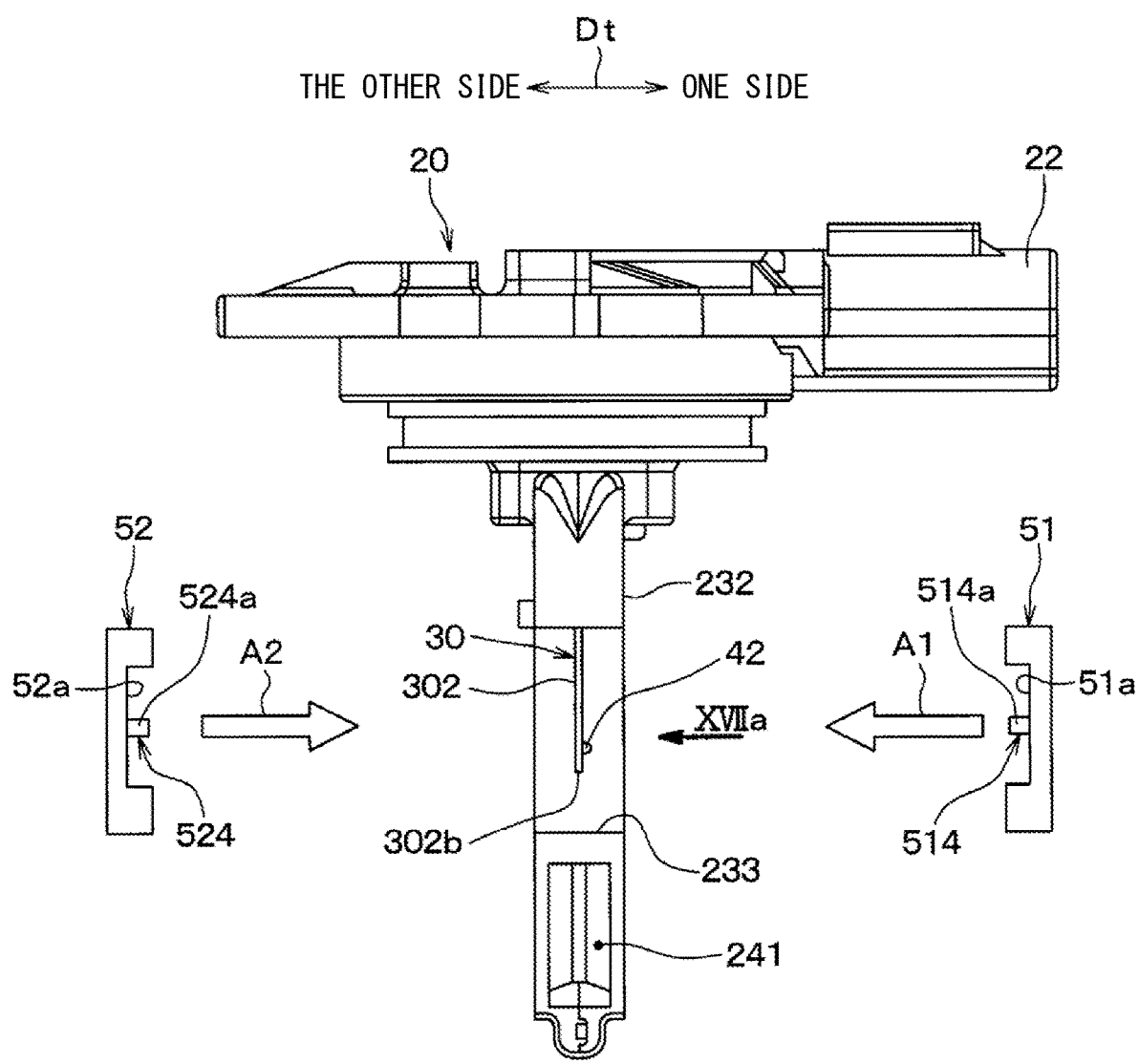
FIG. 23 is an exploded view illustrating a flow rate detector according to an eleventh embodiment, which includes a first interposition member and a second interposition member, corresponding to FIG. 16.
Figure 24:
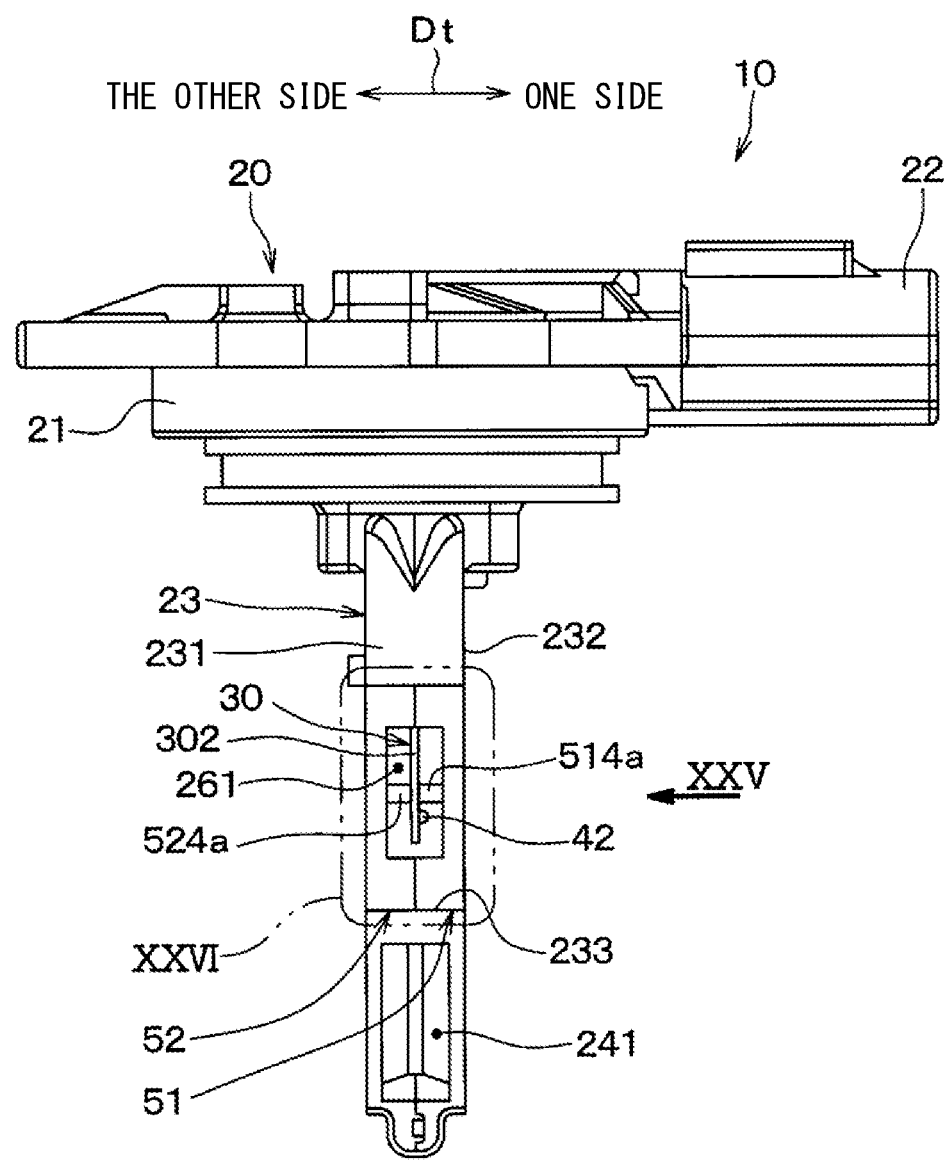
FIG. 24 is a view illustrating the flow rate detector of the eleventh embodiment seen in the same direction as in FIG. 18.
Figure 25:
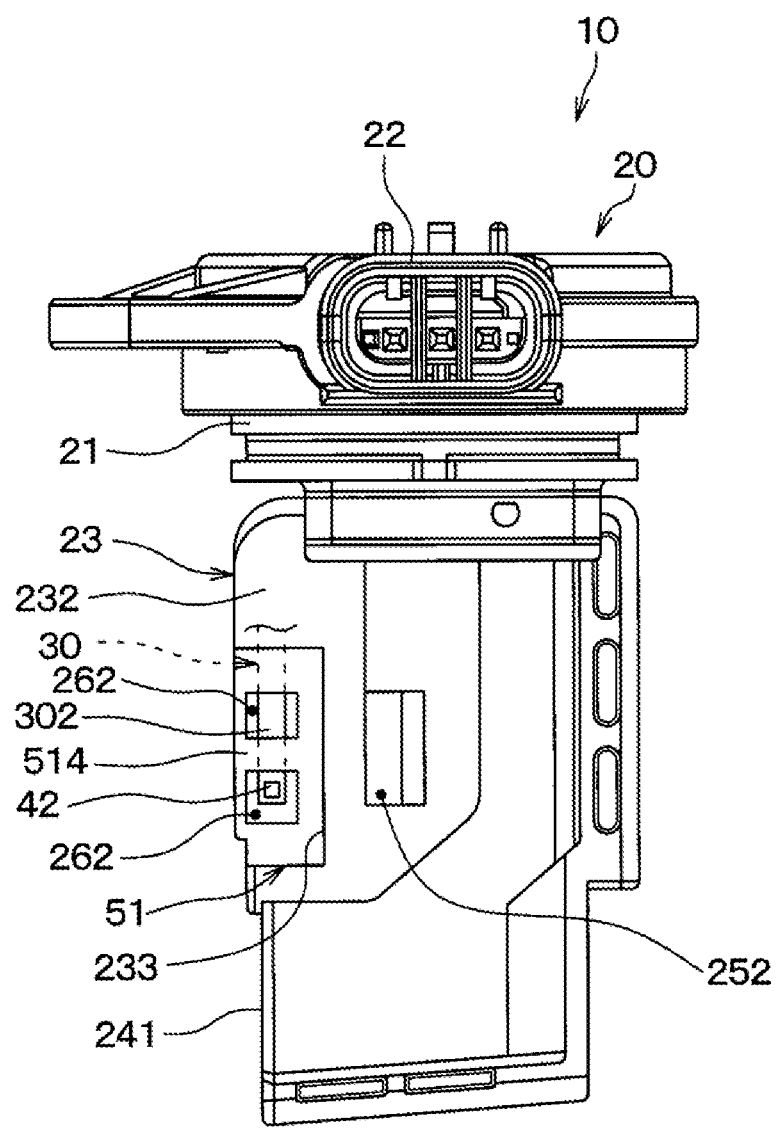
FIG. 25 is a view seen in an arrow direction XXV of FIG. 24 according to the eleventh embodiment, corresponding to FIG. 19.
Figure 25:

As shown in FIGS. 21 and 22, in the present embodiment, the interposition part 50 supports the supported portion 302e of the protrusion 302 differently from the ninth embodiment.

Specifically, the first interposition member 51 of this embodiment does not include the first board-side contact part 512 (see FIG. 20). Therefore, the supported portion 302e of the protrusion 302 is not supported by the first interposition member 51 but is supported by the second interposition member 52. In the present embodiment, the second board-side contact part 522 corresponds to the second contact part 502 (see FIG. 5) in contact with the supported portion 302e.

The second interposition member 52 of the present embodiment has an outlet dividing portion 523 arranged on the other side of the supported portion 302e of the circuit board 30 in the board thickness direction Dt. The outlet dividing portion 523 is provided so as to divide the temperature detection passage outlet 262 on the other side of the protrusion 302 in the board thickness direction Dt into two holes.

The second board-side contact part 522 of the second interposition member 52 has a projection shape protruding from the outlet dividing portion 523 to one side in the board thickness direction Dt. Further, the second board-side contact part 522 has a taper shape that becomes thinner toward the tip end. That is, the second board-side contact part 522 has a tapered surface 522a at the tip end.

In other words, the tapered surface 522a is an inclined surface inclined with respect to the board thickness direction Dt. Specifically, the tapered surface 522a is an inclined surface that is inclined with respect to the board thickness direction Dt and is closer to the board thickness direction Dt than a direction orthogonal to the board thickness direction Dt. In short, the tapered surface 522a is an inclined surface that is inclined with respect to the board thickness direction Dt but the inclination angle relative to the board thickness direction Dt is smaller than to a direction substantially orthogonal to the board thickness direction Dt.

Further, the supported portion 302e of the protrusion 302 is formed as a through hole penetrating in the board thickness direction Dt. A tapered portion of the second interposition member 52 is inserted and fitted to the through hole corresponding to the supported portion 302e from the other side in the board thickness direction Dt. The tapered surface 522a of the second board-side contact part 522 is in contact with the inner surface of the supported portion 302e.

In this way, the interposition part 50 including the second board-side contact part 522 supports the supported portion 302e since the tapered surface 522a of the second board-side contact part 522 is made to be in contact with the supported portion 302e of the protrusion 302. Therefore, even if the dimension of the circuit board 30 or the second interposition member 52 varies, the tapered surface 522a of the second board-side contact part 522 can be reliably brought into contact with the supported portion 302e of the protrusion 302. Then, it is possible to restrict a large stress from being generated in the circuit board 30, the second interposition member 52, or the like due to the dimensional variation in the circuit board 30 or the second interposition member 52.

Aside from the above described aspects, the present embodiment is the same as the ninth embodiment. Further, in the present embodiment, effects similar to those of the ninth embodiment described above can be obtained in the same manner as in the ninth embodiment.

Eleventh Embodiment

An eleventh embodiment is described next. The present embodiment will be explained with respect to portions different from those of the ninth embodiment.

As shown in FIGS. 23 to 26, in the present embodiment, as in the ninth embodiment, the measuring unit 23 of the housing 20 has the housing groove portion 233. Further, the flow rate detector 10 includes the first interposition member 51 and the second interposition member 52. The first interposition member 51 is fitted into the housing groove portion 233 and is fixed to the housing groove portion 233, as indicated by an arrow A1, from one side in the board thickness direction Dt with respect to the housing groove portion 233. The second interposition member 52 is fitted into the housing groove portion 233 from the other side in the board thickness direction Dt with respect to the housing groove portion 233 as shown by an arrow A2, and is fixed to the housing groove portion 233.

Further, as in the ninth embodiment, the temperature detection passage 26, the temperature detection passage inlet 261, and the temperature detection passage outlet 262 are defined in the component integrally formed by the first interposition member 51 and the second interposition member 52. The temperature detection element 42 is disposed in the temperature detection passage 26.

In the present embodiment, the first interposition member 51 and the second interposition member 52 support the protrusion 302, differently from the first embodiment. The first interposition member 51 and the second interposition member 52 of this embodiment correspond to an attachment member fixed to the housing 20. In addition, a view seen in the arrow direction XVIIa in FIG. 23 corresponds to FIG. 17.

Specifically, the first interposition member 51 of the present embodiment is configured as shown in FIGS. 27 to 30. That is, the first interposition member 51 has the inlet groove 51a that forms a part of the temperature detection passage inlet 261, and plural (specifically, two) temperature detection passage outlets 262 arranged in the direction along the protrusion 302 (see FIG. 26). The first interposition member 51 has a partition portion 514 that partitions the plural temperature detection passage outlets 262 from each other. The partition portion 514 has a contact part 514a protruding to the other side in the board thickness direction Dt (that is, toward the protrusion 302 in FIG. 26).

Figure 26:
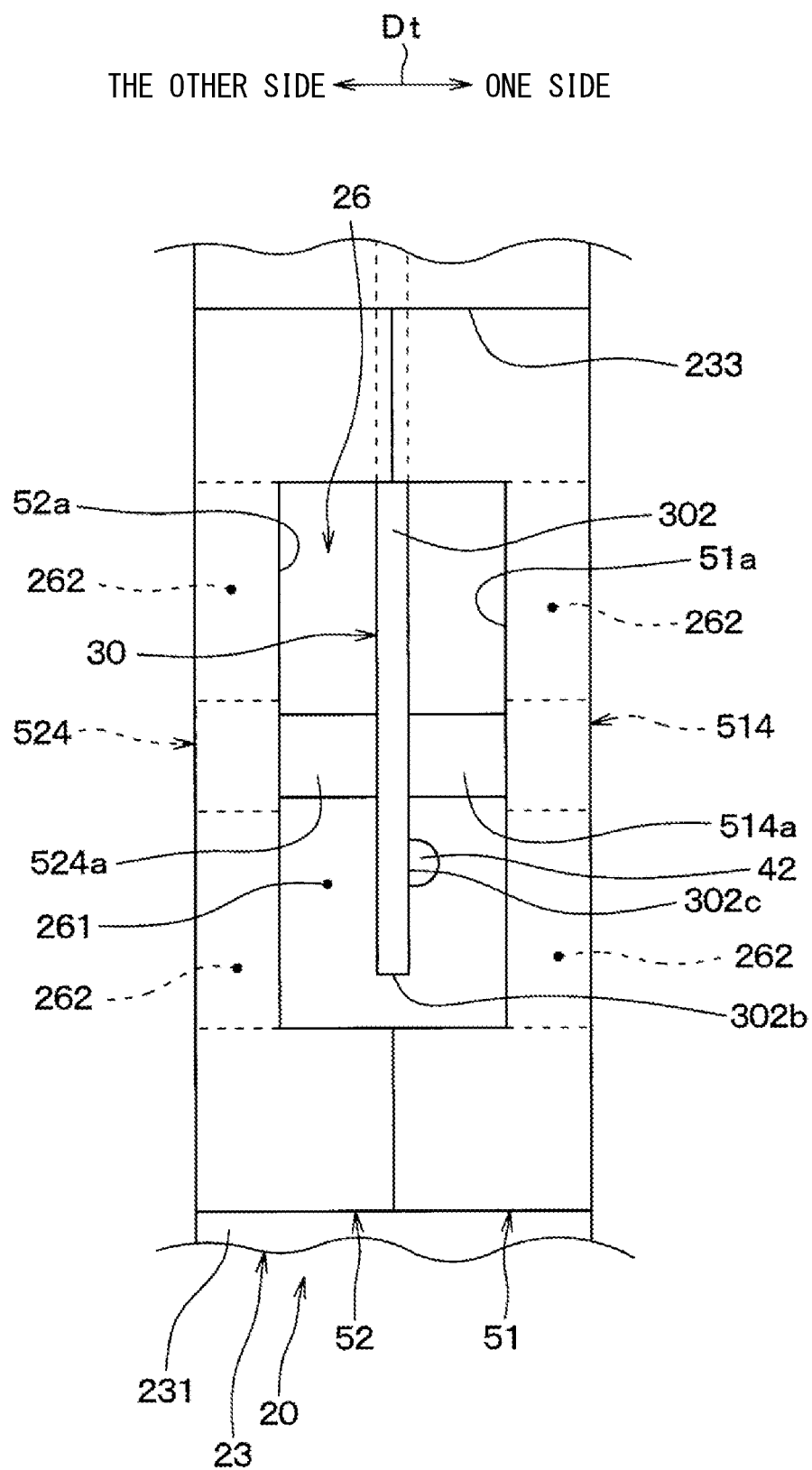
FIG. 26 is an enlarged view illustrating an area XXVI of FIG. 24 in the eleventh embodiment, corresponding to FIG. 20.

The second interposition member 52 of the present embodiment has a shape symmetrical to the first interposition member 51. Specifically, the second interposition member 52 can be provided by inverting the first interposition member 51 in the board thickness direction Dt. Therefore, similar to the first interposition member 51, as shown in FIG. 26, the second interposition member 52 has a partition portion 524 that partitions the plural temperature detection passage outlets 262 from each other. The partition portion 524 has a contact part 524a protruding toward one side in the board thickness direction Dt (that is, toward the protrusion 302 in FIG. 26). Since the shape of the second interposition member 52 is symmetrical to the shape of the first interposition member 51 as described above, the drawings illustrating the second interposition member 52 and corresponding to FIGS. 27 to 30 are omitted.

As described above, since the first interposition member 51 and the second interposition member 52 have the contact part 514a and the contact part 524a, respectively, the first interposition member 51 and the second interposition member 52 are assembled to the housing 20 as follows. As shown by the arrow A1 and the arrow A2 in FIG. 23, the first interposition member 51 and the second interposition member 52 are fitted into the housing groove portion 233. At the same time, the contact parts 514a and 524a are in contact with the protrusion 302 in a state where the protrusion 302 is interposed between the contact parts 514a and 524a. As a result, as shown in FIG. 26, the partition portion 514 including the contact part 514a of the first interposition member 51 and the partition portion 524 including the contact part 524a of the second interposition member 52 restrain the protrusion 302 in the board thickness direction Dt. That is, the partition portions 514 and 524 support the protrusion 302 so as to suppress the displacement of the element fix portion 302c in the board thickness direction Dt.

Therefore, when the flow rate detector 10 vibrates, the bending deformation of the protrusion 302 caused by the vibration is suppressed by the first interposition member 51 and the second interposition member 52 supporting the protrusion 302. Therefore, similarly to the first embodiment, it is possible to reduce the possibility that the protrusion 302 of the circuit board 30 is damaged by vibration, as compared with a conventional structure.

In the present embodiment, a portion of the protrusion 302 in contact with the contact part 514a, 524a is located between the element fix portion 302c and the base end 302a (see FIG. 2). Therefore, the portion of the protrusion 302 in contact with the contact part 514a, 524a is around the element fix portion 302c, but is outside the supported range Wsp shown in FIG. 6.

Figure 27:
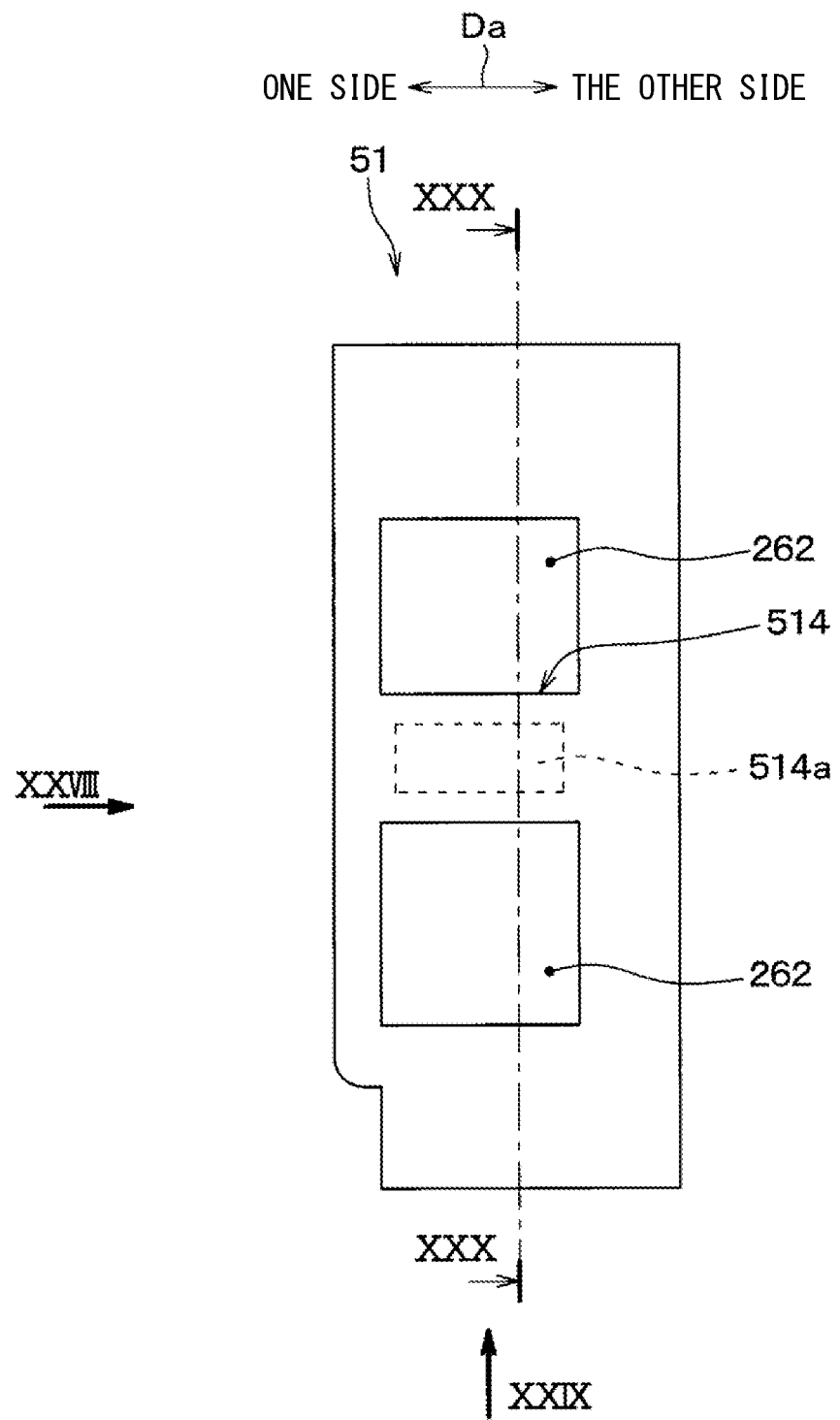
FIG. 27 is a front view illustrating a first interposition member of the flow rate detector of the eleventh embodiment seen in the same direction as FIG. 25.
Figure 28:
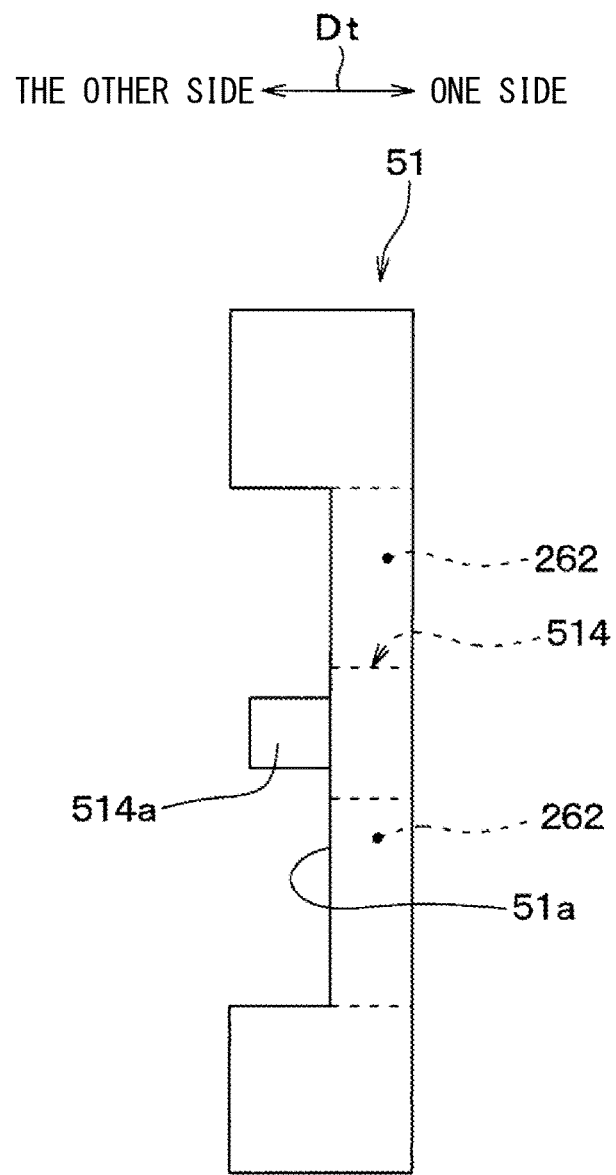
FIG. 28 is a side view illustrating the first interposition member of the flow rate detector of the eleventh embodiment, seen in an arrow direction XXVIII in FIG. 27.
Figure 29:
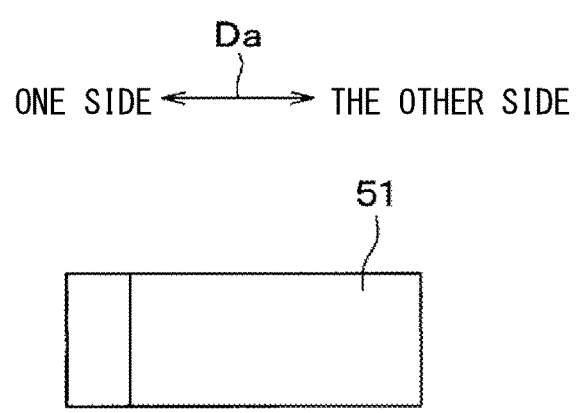
FIG. 29 is a bottom view illustrating the first interposition member of the flow rate detector of the eleventh embodiment, seen in an arrow direction XXIX in FIG. 27.
Figure 30:
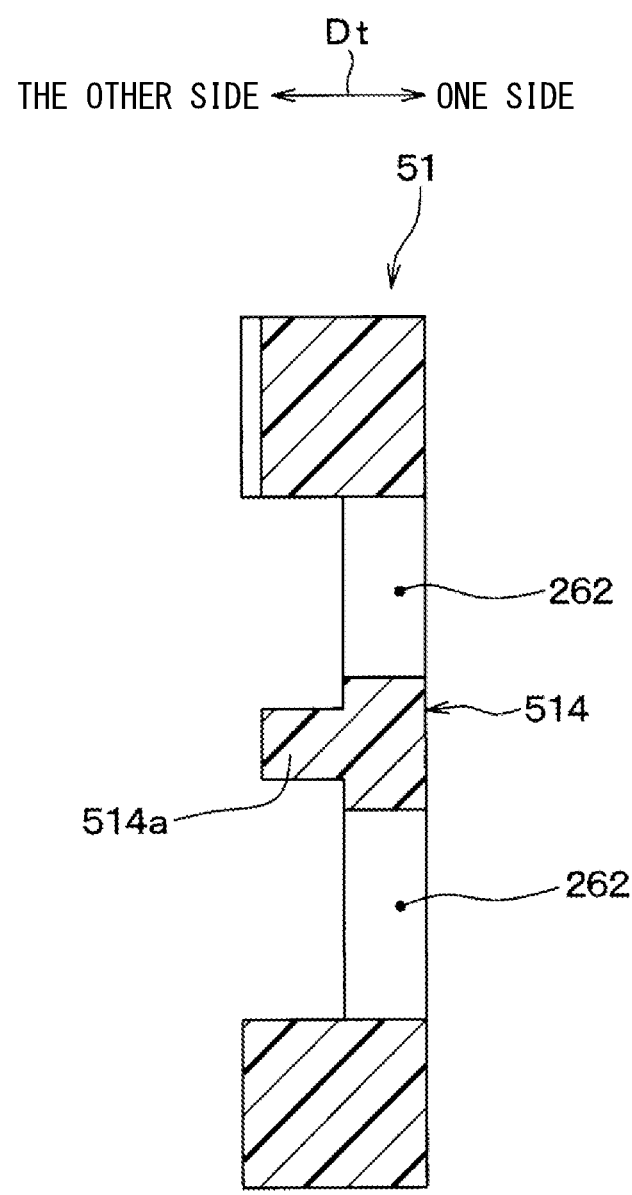
FIG. 30 is a cross-sectional view illustrating the first interposition member of the flow rate detector of the eleventh embodiment, taken along a line XXX-XXX of FIG. 27.

Further, according to the present embodiment, as shown in FIGS. 26 and 27, the partition portion 514 of the first interposition member 51 partitions the two temperature detection passage outlets 262 from each other. Therefore, as compared with the case where the two temperature detection passage outlets 262 are continuous to form a single hole, it is possible to increase the strength of the first interposition member 51 while securing the opening area of the temperature detection passage outlet 262 at the same level. The same applies to the second interposition member 52.

Aside from the above described aspects, the present embodiment is the same as the ninth embodiment. Further, in the present embodiment, effects similar to those of the ninth embodiment described above can be obtained in the same manner as in the ninth embodiment.

Other Embodiments (1) In the first embodiment, as shown in FIG. 5, the interposition part 50 is configured as a component separate from the housing 20, but this is an example. For example, the interposition part 50 may be formed integrally with the measuring unit body 231 of the housing 20.

(2) In the third embodiment, the second contact part 502 of the interposition part 50 shown in FIG. 9 is fixed to the supported portion 302e of the protrusion 302 by, for example, adhesion. This is an example. For example, the second contact part 502 may not be fixed to the supported portion 302e, but may simply in contact with the supported portion 302e in an abutted state. In this case, the interposition part 50 can support the supported portion 302e so as to restrict the element fix portion 302c from being displaced to the other side in the board thickness direction Dt.

(3) In the fifth embodiment, as shown in FIG. 13, the constricted portion 503 of the interposition part 50 is not constricted in the board thickness direction Dt (see FIG. 5), but is constricted in the main passage extending direction Da. This is just an example. For example, the constricted portion 503 may be constricted in the board thickness direction Dt, or may be constricted in both the main passage extending direction Da and the board thickness direction Dt.

(4) In the sixth embodiment, the interposition part 50 shown in FIGS. 5 and 6 is made of a flexible material such as rubber, but this is an example. For example, the interposition part 50 may be made of foamed resin having high flexibility.

(5) In the first embodiment, as shown in FIG. 6, the entire supported portion 302e of the protrusion 302 is provided within the supported range Wsp, but this is an example. For example, a part of the supported portion 302e may be provided within the supported range Wsp, while the supported portion 302e is within the supported range Wsp.

(6) In each of the embodiments, as shown in, for example, FIGS. 1 and 2, the body portion 301 of the circuit board 30 is fixed to the measuring unit 23 by being sandwiched between the measuring unit body 231 and the measuring unit cover 232. This is just an example. For example, the measuring unit body 231 may be formed by insert molding using the circuit board 30 as an insert, so that the body portion 301 of the circuit board 30 is fixed to the measuring unit 23.

(7) In the eleventh embodiment, as shown in FIG. 26, the first interposition member 51 has the contact part 514a abutting on the protrusion 302 and arranged on one side in the board thickness direction Dt with respect to the protrusion 302. The second interposition member 52 has the contact part 524a that is in contact with the protrusion 302 and arranged on the other side of the protrusion 302 in the board thickness direction Dt. This is an example. For example, one of the contact parts 514a and 524a may not be provided while the element fix portion 302c of the circuit board 30 is suppressed from being displaced to one side or the other side in the board thickness direction Dt.

(8) In the first embodiment, the entire substrate assembly 28 is provided inside the housing 20 as shown in FIGS. 1 and 2, but this is an example. For example, the substrate assembly 28 may be partially protruded from the housing 20.

(9) In each of the embodiments, the sub passage 24, the flow rate detection passage 25, and the temperature detection passage 26 formed in the housing 20 have the respective shapes as shown in FIGS. 1 and 2. This is an example. The shapes of the passages 24, 25, 26 may be modified.

(10) In each of the embodiments, as shown in FIG. 2, the flow rate detector 10 may include another element for detecting another physical quantity, in addition to the flow rate detection element 41 and the temperature detection element 42.

(11) In each of the embodiments, as shown in FIGS. 1 and 2, the flow rate detector 10 is applied to the internal combustion engine control system. The flow rate detector 10 may be applicable to various systems other than the internal combustion engine control system.

(12) The present disclosure is not limited to the specific embodiments described above, and various modifications can be made. The above embodiments are not independent of each other, and can be appropriately combined together except when the combination is obviously impossible.

Further, in each of the embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

What is claimed is:

1. A flow rate detector configured to detect a flow rate of fluid comprising:
   a housing; and
   a substrate assembly disposed in the housing, the substrate assembly having a flow rate detection element to detect a flow rate of the fluid, a temperature detection element to detect a temperature of the fluid, and a circuit board on which the flow rate detection element and the temperature detection element are mounted, wherein
   the circuit board includes
   a body portion fixed to the housing, and
   a protrusion extended to protrude from the body portion, the protrusion having an element fix portion to which the temperature detection element is fixed,
   the protrusion has a supported portion within a supported range including a position of the element fix portion, the supported range being defined from the element fix portion to a tip end of the protrusion along an extension direction of the protrusion, and
   the supported portion is supported by the housing so as to suppress a displacement of the element fix portion in a thickness direction of the circuit board; and
   the flow rate detector further comprises an interposition part in contrast with each of the housing and the supported portion, and the housing supports the supported portion through the interposition part.

2. The flow rate detector according to claim 1, comprising
   the interposition part having a first contact part in contact with the housing and a second contact part in contact with the supported portion, wherein
   the interposition part is shaped in which a cross-sectional area is partially reduced at a part of the interposition part between the first contact part and the second contact part.

3. The flow rate detector according to claim 2, wherein the interposition part is configured as a component different from the housing.

4. The flow rate detector according to claim 1, comprising
   the interposition part in contact with each of the housing and the supported portion, wherein
   the interposition part has higher flexibility than the housing.

5. The flow rate detector according to claim 1, comprising
   the interposition part in contact with each of the housing and the supported portion, wherein
   the interposition part has higher heat insulating property than the housing.

6. The flow rate detector according to claim 1, comprising
   the interposition part in contact with each of the housing and the supported portion, wherein
   the interposition part has an inclined surface inclined with respect to the thickness direction, and
   the inclined surface is in contact with the supported portion such that the interposition part supports the supported portion.

7. The flow rate detector according to claim 1, wherein
   the housing is configured as a single component including a body fix part to which the body portion is fixed, and
   the single component further includes a support part in contact with the supported portion to support the supported portion.

8. The flow rate detector according to claim 1, wherein
   the flow rate detection element is arranged in a flow rate detection passage in which the fluid flows,
   the temperature detection element is arranged in a temperature detection passage in which the fluid flows, and
   the housing is configured such that the flow rate detection passage is separated from the temperature detection passage.

9. A flow rate detector configured to detect a flow rate of fluid comprising:
   a housing;

a substrate assembly disposed in the housing, the substrate assembly having a flow rate detection element to detect a flow rate of the fluid, a temperature detection element to detect a temperature of the fluid, and a circuit board on which the flow rate detection element and the temperature detection element are mounted; and an attachment member fixed to the housing, wherein the circuit board includes a body portion fixed to the housing, and a protrusion extended to protrude from the body portion, the protrusion having an element fix portion to which the temperature detection element is fixed, the temperature detection element is arranged in a temperature detection passage in which the fluid flows, the attachment member defines a plurality of outlets for the temperature detection passage, the attachment member has a partition portion that partitions the plurality of outlets from each other, and the partition portion supports the protrusion so as to suppress a displacement of the element fix portion in a thickness direction of the circuit board.

\* \* \* \* \*